United States Patent
Arbetter

(10) Patent No.: US 10,958,169 B2
(45) Date of Patent: Mar. 23, 2021

(54) POWER CONVERTER WITH ROBUST STABLE FEEDBACK

(71) Applicant: Silanna Asia Pte Ltd, Singapore (SG)

(72) Inventor: Barry S. Arbetter, Raleigh, NC (US)

(73) Assignee: Silanna Asia Pte Ltd, Singapore (SG)

(*) Notice: Subject to any disclaimer, the term of this patent is extended or adjusted under 35 U.S.C. 154(b) by 0 days.

(21) Appl. No.: 16/798,175

(22) Filed: Feb. 21, 2020

(65) Prior Publication Data
US 2020/0195140 A1 Jun. 18, 2020

Related U.S. Application Data

(63) Continuation-in-part of application No. 15/877,282, filed on Jan. 22, 2018, now Pat. No. 10,630,177.
(Continued)

(51) Int. Cl.
*H02M 3/156* (2006.01)
*H02M 1/08* (2006.01)
(Continued)

(52) U.S. Cl.
CPC ............ *H02M 3/156* (2013.01); *H02M 1/08* (2013.01); *G05F 1/575* (2013.01); *H02M 2001/0009* (2013.01); *H02M 2001/0025* (2013.01)

(58) Field of Classification Search
CPC .......... G05F 1/575; G05F 1/56; H02M 3/156; H02M 3/158; H02M 3/1588; H02M 3/155;
(Continued)

(56) References Cited

U.S. PATENT DOCUMENTS 6,614,136 B2  9/2003  Lee
8,217,637 B2  7/2012  Tsui et al.
(Continued)

FOREIGN PATENT DOCUMENTS

CN  104283426 A  1/2015
CN  105009433 A  10/2015
JP  2005198404 A  7/2005

OTHER PUBLICATIONS

Office Action dated May 22, 2020 for Chinese Patent application No. 201780027771.1.
(Continued)

*Primary Examiner* — Bryan R Perez
(74) *Attorney, Agent, or Firm* — MLO, a professional corp.

(57) ABSTRACT

A power converter includes an input node on an input side of the power converter, an output node on an output side of the power converter, a switch coupled to the input node and having a switch control node, an inductor coupled to the switch and to the output node, and a feedback compensation and control circuit between the output node and the switch control node. The feedback compensation and control circuit includes two or more programmable resistors to adjust one or more gains of i) a proportional-integral-derivative portion, and ii) a bandpass filter portion of the feedback compensation and control circuit. The feedback compensation and control circuit receives an output voltage from the output node and generates a compensated feedback signal based on the output voltage from the output node and the one or more gains, the switch control node being controlled based on the compensated feedback signal.

20 Claims, 18 Drawing Sheets

Related U.S. Application Data which is a continuation of application No. 15/245,078, filed on Aug. 23, 2016, now Pat. No. 9,882,473.

(60) Provisional application No. 62/336,439, filed on May 13, 2016.

(51) Int. Cl.
  *H02M 1/00* (2006.01)
  *G05F 1/575* (2006.01)

(58) Field of Classification Search
  CPC ............... H02M 3/1582; H02M 3/157; H02M 2003/1566; H02M 2003/1557; H02M 2001/0012
  See application file for complete search history.

(56) References Cited

U.S. PATENT DOCUMENTS

| | | | |
|---|---|---|---|
| 9,256,236 | B2 | 2/2016 | Kim et al. |
| 2002/0097591 | A1 | 7/2002 | Groot |
| 2006/0006933 | A1 | 1/2006 | Nguyen |
| 2006/0023476 | A1 | 2/2006 | Fosler |
| 2007/0103945 | A1 | 5/2007 | Doerrer |
| 2009/0174383 | A1* | 7/2009 | Tsui .................... H02M 3/156 323/282 |
| 2009/0284235 | A1 | 11/2009 | Weng et al. |
| 2010/0156385 | A1 | 6/2010 | Werking |
| 2011/0140785 | A1 | 6/2011 | Lian et al. |
| 2012/0049827 | A1 | 3/2012 | Hirose |
| 2014/0146577 | A1 | 5/2014 | Uno |
| 2014/0253060 | A1 | 9/2014 | Lin et al. |
| 2014/0266112 | A1 | 9/2014 | Cheng et al. |
| 2014/0292288 | A1 | 10/2014 | Yan et al. |
| 2016/0079858 | A1 | 3/2016 | Chen |

OTHER PUBLICATIONS

Arikatla et al., DC-DC Power Converter with Digital PID Controller, Applied Power Electronics Conference and Exposition (APEC), 2011 Twenty-Sixth Annual IEEE, Mar. 2011, pp. 327-330.

Huerta et al., Design methodology of a non-invasive sensor to measure the current of the output capacitor for a very fast non-linear control, Applied Power Electronics Conference and Exposition, Feb. 2009. APEC 2009, pp. 806-812.

International Search Report and Written Opinion dated Aug. 8, 2017 for PCT Patent Application No. PCT/IB2017/052512.

Kapat et al., Formulation of PID Control for DC-DC Converters Based on Capacitor Current: A Geometric Context, COMPEL, 2010 IEEE 12th Workshop, Jun. 28-30, 2010, pp. 1-6.

Notice of Allowance dated Oct. 3, 2019 for U.S. Appl. No. 15/877,282.

Notice of Allowance dated Sep. 29, 2017 for U.S. Appl. No. 15/245,078.

Office Action dated Jan. 11, 2019 for U.S. Appl. No. 15/877,282.

Office Action dated Jun. 21, 2018 for U.S. Appl. No. 15/877,282.

Office Action dated Jun. 27, 2019 for U.S. Appl. No. 15/877,282.

Office Action dated May 11, 2017 for U.S. Appl. No. 15/245,078.

Oliver, Ripple-Based Control Techniques for Buck Type DC-DC Converter, ESSCIRC Sep. 2015, pp. 49-98.

Soto et al., Non-Linear Digital Control Breaks Bandwidth Limitations, Twenty-First Annual IEEE Applied Power Electronics Conference and Exposition, Mar. 2006, APEC '06, pp. 724-730.

Viejo et al., Fast Control Technique Based on Peak Current Mode Control of the Output Capacitor Current, 2010 IEEE Energy Conversion Congress and Exposition, Sep. 2010, pp. 3396-3402.

Wu et al., Area- and Power-Efficient Monolithic Buck Converters with Pseudo-Type III Compensation, IEEE Journal of Solid-State Circuits, vol. 45, No. 8, Aug. 2010, pp. 1446-1455.

Yuan et al., Psuedo-Type III Compensation Integrated in a Voltage-Mode Buck Regulator, IEEE Transactions on Circuits and Systems, Dec. 2014, pp. 997-1001.

* cited by examiner

300

400

500

600      601

800

900

901

$$\frac{v_{BPF}}{v_0} = -\frac{\left(\frac{1}{R_1C_1}\right)s}{\left(s^2 + \frac{(C_1+C_2)}{C_1C_2R_2}s + \frac{1}{R_1R_2C_1C_2}\right)}$$

902

$$\omega_0 = \frac{1}{\sqrt{R_1R_2C_1C_2}}$$

$$Q = \frac{1}{(C_1+C_2)}\sqrt{\frac{C_1C_2R_2}{R_1}}$$

1000

1100

1200

1300

1400

1700

1800

POWER CONVERTER WITH ROBUST STABLE FEEDBACK

CROSS-REFERENCE TO RELATED APPLICATION

This application is a continuation in part of U.S. Non-Provisional application Ser. No. 15/877,282, filed Jan. 22, 2018, which is a continuation of U.S. Pat. No. 9,882,473, issued Jan. 30, 2018, which claims the benefit of U.S. Provisional Application No. 62/336,439, filed May 13, 2016, all of which are incorporated by reference herein in their entirety.

BACKGROUND OF THE INVENTION

Electronic devices often need to generate multiple power regimes while only being powered by a single source. For example, a laptop computer may only have a single battery but may need to produce power regimes with different supply voltages for the various components on the laptop. Furthermore, regardless of the need for multiple power regimes, electronic devices often need to condition the power that is delivered to them from an external source. Returning to the example of a laptop, the laptop processor contains sensitive electronics and exhibits a widely varying power demand based on how hard the processor is working. Simply plugging in a DC version of the mains voltage source is not an option because the processor will not be shielded from dips or surges in the power supply and the power supply will likewise not be able to keep pace with the rapid transitions in the power drawn by the processor. The aforementioned requirements are addressed by power converters.

Power converters receive power from a supply power regime and generate a regulated power regime. In one example, the power converter stabilizes a supply voltage in the regulated power regime and provides a varying current from the supply power regime to do so. Varying the current allows such a power converter to supply the varying power needs of any components or devices in the regulated power regime while keeping the supply voltage of the regulated power regime stable. Other power converters generate the regulated power regime by varying the voltage while keeping the current stable or vary both the current and voltage to keep an amount of power delivered to the regulated regime stable.

Power converters that vary their conditions with the varying status of the load in the regulated regime need information regarding that status. A common way to provide this information is through an electrical feedback path from the load back to the converter. The system can be controlled by negative feedback that forces a parameter back to a controlled target by pushing in the opposite direction of a detected variance from that controlled target. However, the utilization of electrical feedback paths presents the possibility of instability. Both the phase shift and amplification of an electrical path can vary with frequency. As a result, a system that exhibits a negative feedback characteristic to signals of a given frequency may exhibit a positive feedback characteristic to signals of another frequency. Power converters can utilize compensators in their feedback system to ensure the overall system is stable and well-behaved.

SUMMARY OF INVENTION

In some embodiments, a power converter includes an input node on an input side of the power converter, an output node on an output side of the power converter, a switch coupled to the input node and having a switch control node, an inductor coupled to the switch and to the output node, and a feedback compensation and control circuit between the output node and the switch control node. The feedback compensation and control circuit includes two or more programmable resistors to adjust one or more gains of i) a proportional-integral-derivative (PID) portion of the feedback compensation and control circuit, and ii) a bandpass filter portion of the feedback compensation and control circuit. The feedback compensation and control circuit receives an output voltage from the output node and generates a compensated feedback signal based on the output voltage from the output node and the one or more gains, the switch control node being controlled based on the compensated feedback signal.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

Power converters with robust control systems and operating methods are disclosed. Switching converters will be utilized as a vehicle for illustrating the benefits of these systems and methods, but the approaches disclosed herein are more broadly applicable to power converters in general. Some of the described approaches enable the use of minimal output capacitance but provide stability regardless of an increase in capacitance placed on the output node.

Figure 1:
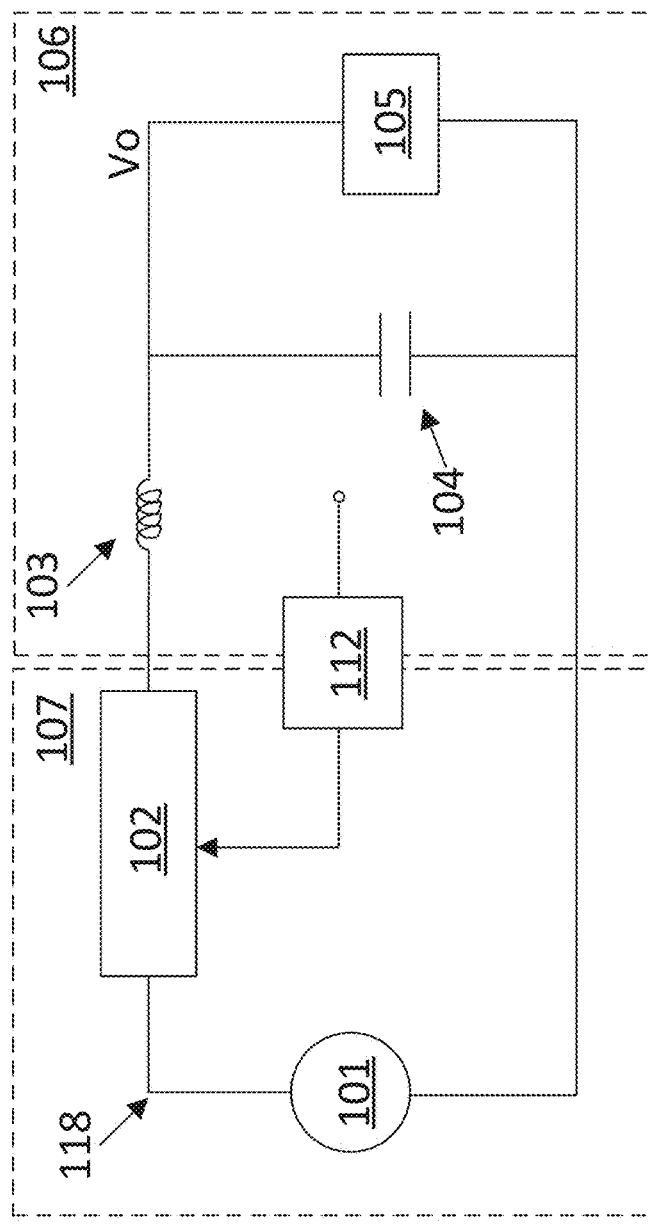
FIG. 1 illustrates a block diagram of a power converter topology in accordance with embodiments of the present invention.
Figure 1:
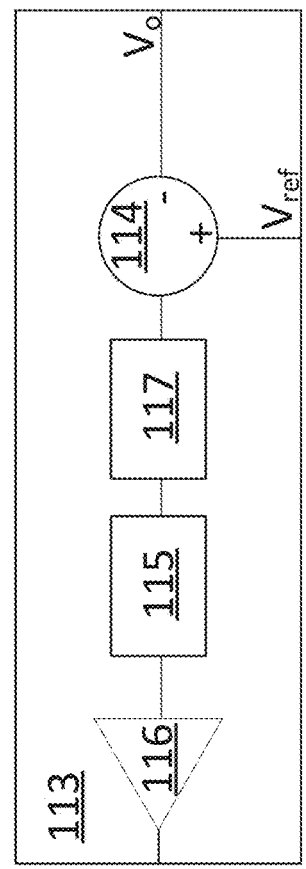
Figure 1:
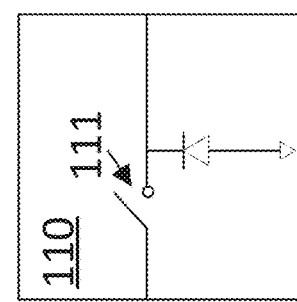
Figure 1:
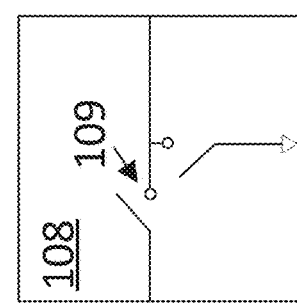

An example power converter 100 is provided in FIG. 1. Power converter 100 includes a supply 101 connected to an input node 118, a switch circuit 102, an inductor 103, and a capacitor 104 for powering a load 105. The supply operates in the supply regime, and the load operates in the regulated regime. The inductor and capacitor of this example form the output filter of this particular switching converter. Power converter 100 is a buck converter that converts a higher voltage on the input node to a lower voltage on the output node. However, the teachings herein are applicable to buck, boost, buck-boost, boost-buck, or transformer-based converters. Two variants of switch circuit 102 are illustrated by circuit 108 (with switch 109) and circuit 110 (with switch 111). In either case, switch 109 and switch 111 are connected to an input node of the power converter and split the power converter between an output side 106 and an input side 107. The converter also includes a feedback path 112 that feeds back information regarding the output side 106 to switch circuit 102. The feedback path can be located between the output node, labeled $V_o$ in this example, and a control node for a switch in the switch circuit 102. For example, the control node could be the gate of a field effect transistor serving as switch 109 or 111. The feedback path can include digital information, analog information, or a combination of both.

Feedback path 112 will often include a pulse-width modulator circuit to alter the duty cycle of switch circuit 102 based on the information fed back from output side 106. In this manner, power is delivered from supply 101 to load 105 in a regulated manner. In circuit 108 the illustrated switches may have opposite states and the duty cycle may affect the relative duration of occupancy for those two switches in either of those opposite states. One potential variant of feedback path 112 is illustrated by block diagram 113 which shows error amplifier 114 receiving a reference voltage $V_{ref}$ equal to the target voltage for the regulated regime. The output of the amplifier is provided to a pulse width modulator 115 and switch driver 116 which alter the duty cycle of the switch or switches in switch circuit 102 and thereby alter the amount of power transferred from the input side to the output side of the converter to maintain the output node at a target voltage proportional to $V_{ref}$. The further the output voltage is from the reference voltage the larger the swing in the duty cycle of the switch. As the duty cycle varies, it forces the output voltage back to its desired value. A compensator 117, which is described with reference to FIG. 2, is provided between the error amplifier 114 and the pulse width modulator 115.

The stability of power converter 100 can be described with reference to a loop gain T(s) that describes the control loop of the converter. The overall control loop of power converter 100 includes feedback path 112, the control node of switch circuit 102, and the output node. In regular operation, the control loop can be at least partly defined by a loop gain. The phase and gain of the loop gain can be plotted separately across frequency to illustrate whether or not the loop gain is greater than unity when the characteristic of the loop switches from negative to positive. This determination can be utilized to estimate how stable the control loop is.

Figure 2:
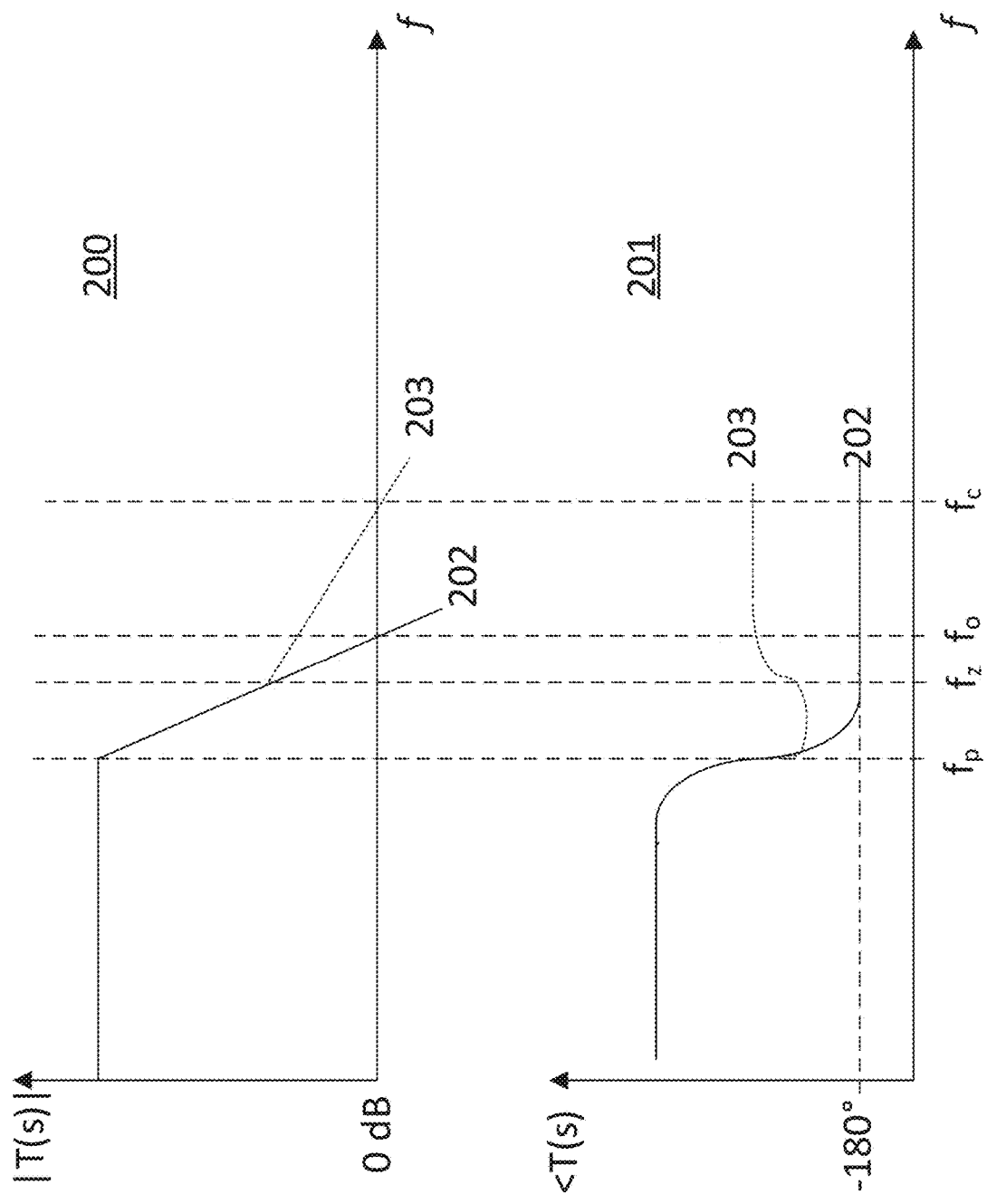
FIG. 2 illustrates a gain and phase plot of the closed loop transfer function of the control loop of a power converter to illustrate certain aspects of embodiments of the present invention.

FIG. 2 provides gain plot 200 and phase plot 201 for the loop gain of the converter. The abscissa of both plots is frequency f provided in hertz in a logarithmic scale. The ordinate of gain plot 200 is a scalar value representative of the magnitude the loop gain. The ordinate of the phase plot 201 is a phase shift value in degrees where a 180° shift marks a change in a characteristic of the loop gain between negative and positive. The plot includes two sets of curves as it illustrates the behavior of the control loop both with and without compensator 117 included. The loop gain without compensation is marked by reference numeral 202. The loop gain with compensation is marked by reference numeral 203.

Without compensation, the output filter introduces a set of complex poles at frequency $f_p$ set by the magnitude of inductor 103 and capacitor 104. The two poles cause a drop in the magnitude of the transfer function with a slope of −40 dB per decade and a phase shift from 0 to −180°. In the uncompensated case, the result is a −180° phase shift at the crossover frequency $f_o$. The system is therefore unstable because the feedback loop will exhibit appreciable positive feedback. Compensator 117 can be used to add a zero to the transfer function at frequency $f_z$. The zero will ease the decrease in gain to −20 dB per decade but will add a phase shift in the opposite direction. As shown by the lines marked 203, the resulting system should be stable as the phase shift at the new crossover frequency $f_C$ is −90° instead of −180°. The phase shift at the crossover frequency, added to 180 degrees, can be referred to as the phase margin. A target of 45° is usually acceptable for producing a system that is stable for all conditions. Low phase margin causes overshoot and ringing in the transient response of the converter. In general, $f_z$ needs to be in the range of $f_C/2$ to produce a sufficient phase margin. Notably, the compensator does not need to be in series with the main path of the feedback loop and can instead be placed in parallel (i.e., the configuration of compensator 117 in feedback path 112 is only an example).

Figure 3:
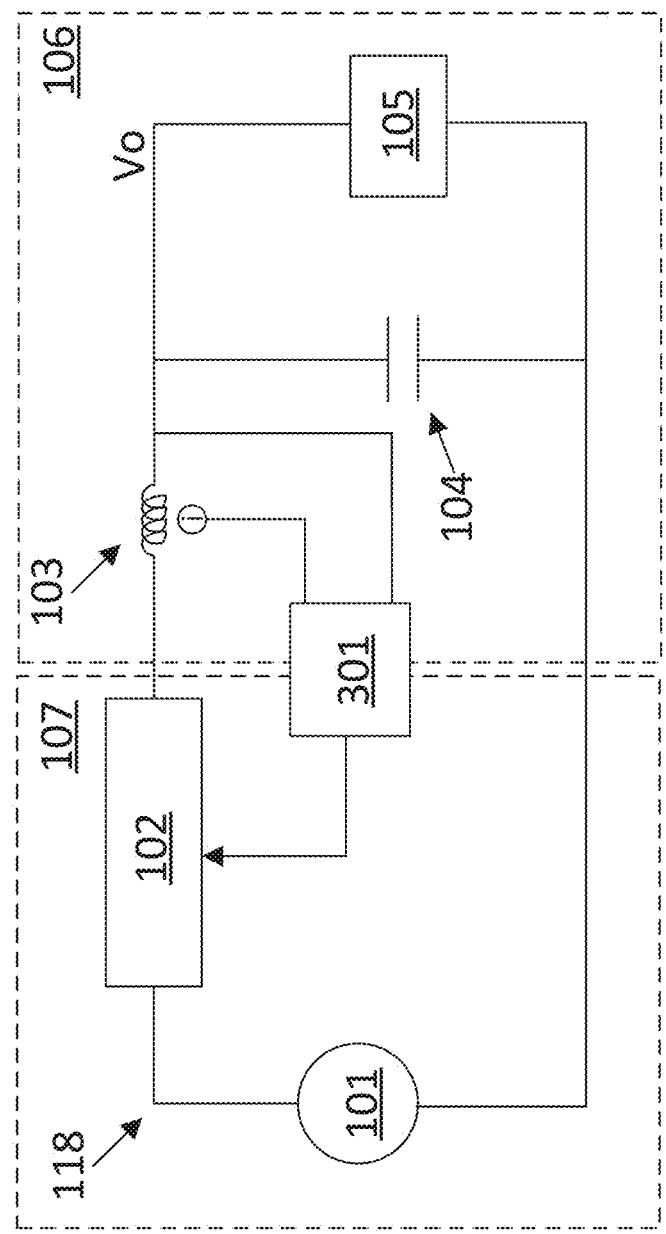
FIG. 3 illustrates a block diagram of a power converter topology that obtains two measurement signals from the output side of the power converter in accordance with embodiments of the present invention.

FIG. 3 illustrates a power converter 300 with a compensation scheme that provides the zero illustrated by lines marked 203. As illustrated, feedback path 301 includes a measurement of the output voltage $V_o$ and also includes a measurement of the current through inductor 103. This approach provides the required zero via the measurement of the inductor current and also guides the control loop to the desired voltage by comparing $V_o$ to $V_{ref}$. The benefit of this approach is that, since both the complex poles of the uncompensated transfer function and the zero of the compensator are proportional to the size of the output filter passives, the zero tracks changes in the output capacitance and will provide stability even if the cross-over frequency of the closed loop transfer function is pushed in by increased output capacitance from load 105. In some embodiments, the compensator is generally chosen to meet several metrics for the converters performance besides stability such as a minimum rise time, maximum allowable overshoot of the regulated voltage, maximum steady-state error, and settling time constraints. Since $f_z$ needs to be less than half of $f_C$, setting $f_z$ based on the output passive devices requires an overly large capacitor in order to be effective. The compensator scheme should both scale with increased capacitance on the output node and also not place an additional limitation on the size of the output passives.

Figure 4:
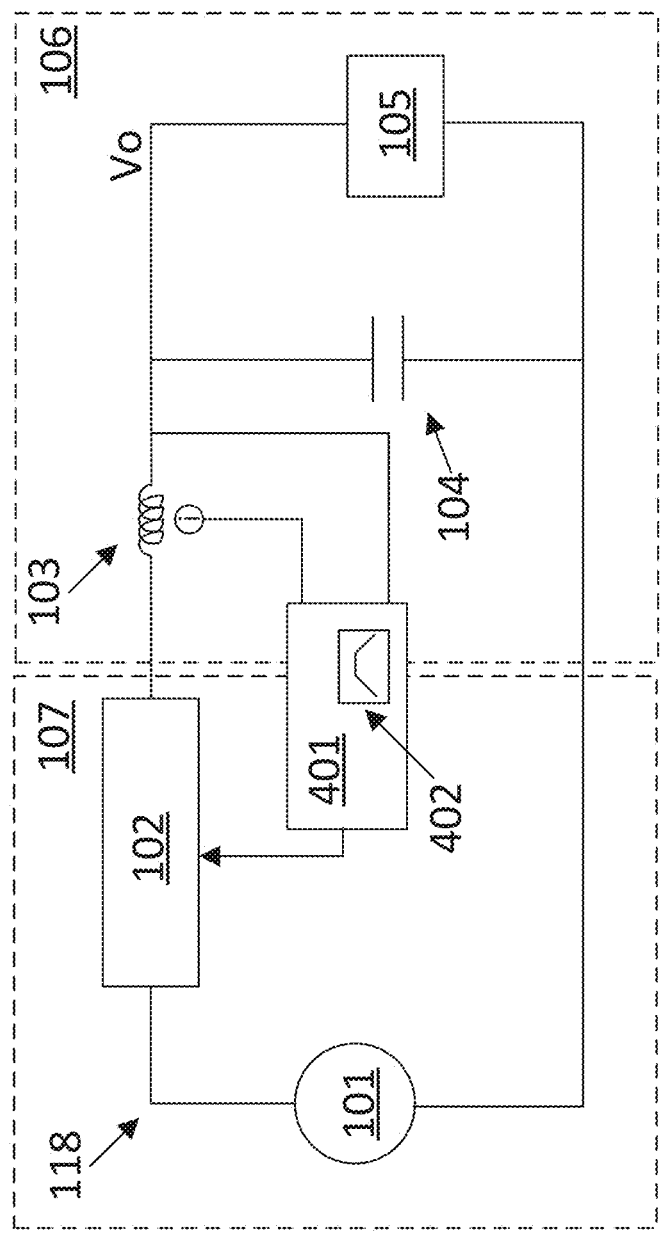
FIG. 4 illustrates a block diagram of a power converter topology that obtains two measurement signals from the output side of the power converter and includes a bandpass filter on the feedback path in accordance with embodiments of the present invention.

FIG. 4 illustrates another power converter 400 that utilizes feedback path 401 which obtains measurement signals representative of both the inductor current and output voltage. As before, power converter 400 includes a switch circuit 102 which will include a switch coupled to an input node and having a control node. The power converter also includes a feedback path 401 between the output node marked $V_o$ and that control node. However, in contrast to the approach in power converter 300, feedback path 401 includes a first circuit block 402 with a bandpass transfer function that operates on the signal drawn from the output voltage. As a result, in power converter 400, capacitor 104 can be set to the minimum value required by other constraints, besides those having to do with stability of the feedback path. This is because the zero provided by the first circuit block 402 is dissociated from the output passives and stability is provided by feedback path 401 even with minimal output capacitance on $V_o$. At the same time, if additional output capacitance is added by load 105, compensation provided by the measurement of current through inductor 103 can prevent the system from entering an unstable state.

Figure 5:
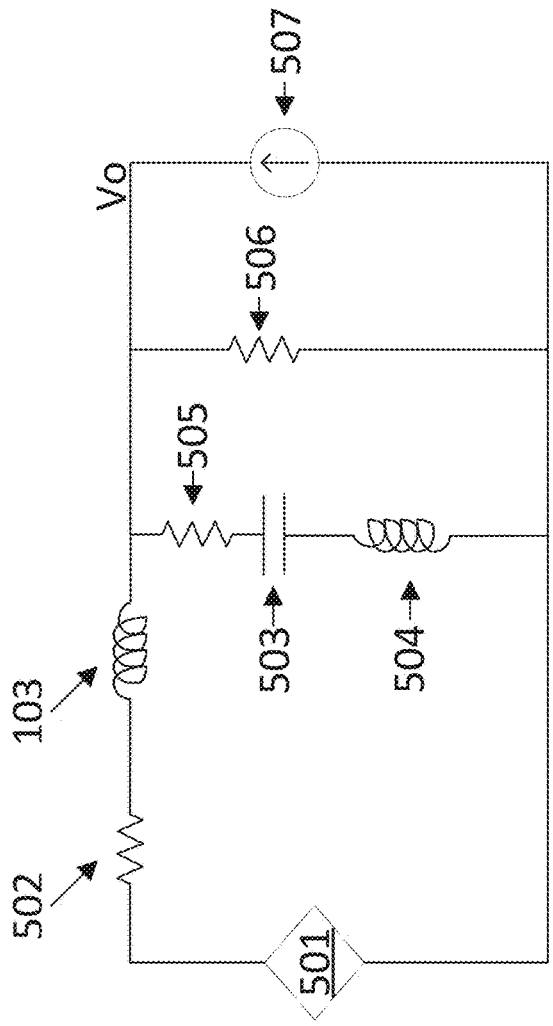
FIG. 5 illustrates a small signal circuit diagram of a power converter to illustrate certain aspects of embodiments of the present invention.

The action of first circuit block 402 can be described with reference to FIG. 5. This figure illustrates a small signal block diagram 500 of power converter 400 with capacitor 104 replaced with a more accurate model of the capacitor that includes certain parasitic elements. For example, the capacitor could exhibit an appreciable $R_c$ and $L_c$ in series with the actual capacitance. External ceramic capacitors generally exhibit this characteristic. In small signal block diagram 500, the capacitance of capacitor 104 is shown as element 503, and the parasitic resistance $R_c$ and inductance $L_c$ are shown as elements 505 and 504 respectively. The behaviors of the switch circuit and series resistance of the filter inductor are modeled by variable supply element 501 and resistor 502. Variable supply element 501 has a voltage $d \times V_{in}$ (d multiplied by $V_{in}$) where $V_{in}$ is the input voltage and d is the small-signal variation of the control switch duty cycle. Resistor element 502 has a resistance $R_L$ which includes the filter inductor series resistance and the average switch resistance over a switching cycle. The behavior of the load of the converter is modeled by resistor 506 and current source 507. Resistor 506 has a resistance R, and current source 507 has a current $i_o$. The small-signal output voltage is then set by the equations in box 508. In this equation, R is the resistance of the load, L is the inductance of inductor 103, C is the capacitance of capacitor 503, $R_L$ is the parasitic series resistance of inductor 103 plus the average switch resistance over a switching cycle, and the parasitic inductance and resistance of capacitor 503 are $R_c$ and $L_c$.

As can be determined via careful inspection, the equation in box 508 exhibits its own resonant frequency zeroes and quality factor that is set in part by the parasitics of the capacitor $R_c$ and $L_c$. This is problematic because $G_F$ affects the gain of the control loop. To counteract the resonance of the $G_F$ zeroes, the bandpass filter transfer function can be selected such that it has the same poles as the zeroes of $G_F$. As the bandpass filter transfer function appears on the feedback path of the control loop, the effect of the parasitics will be canceled out in the overall control loop. First circuit block 402 is generally designed with attention to both the quality factor and center frequency of the band pass transfer function.

First circuit block 402 can be implemented by any band pass filter. However, certain benefits accrue to approaches in which first circuit block 402 is implemented as a multipath feedback active filter. In particular, the magnitude of the loop gain in decibels of the circuit block should remain appreciably positive at the center frequency of the filter to assure that the loop retains control of the circuit at that frequency. As used herein the term loop gain refers to the product of the open loop gain and feedback gain for a given circuit block. For stability, the phase margin of the loop gain should be greater than 45°, and the cross over frequency of the loop gain in decibels should be greater than the center frequency of the band pass filter.

Figure 6:
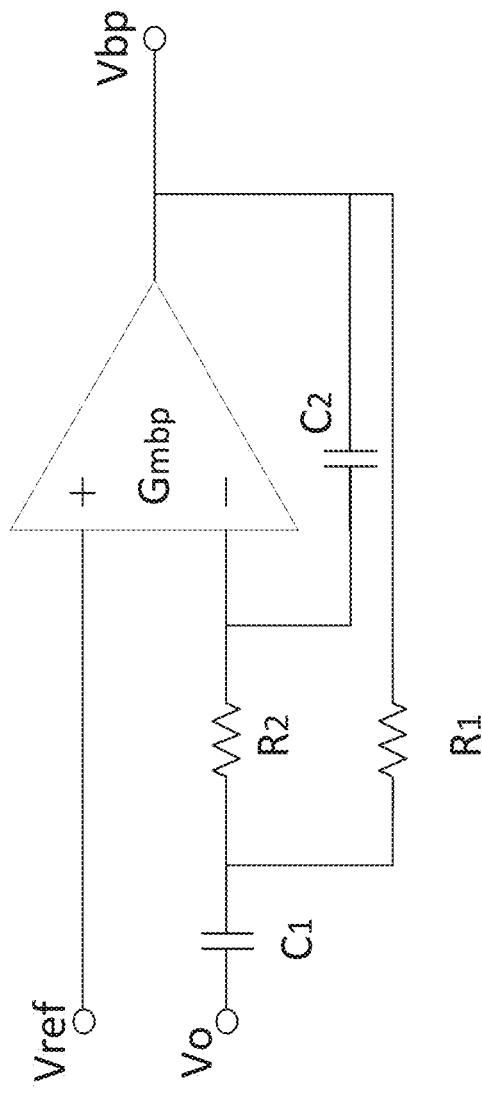
FIG. 6 illustrates two block diagrams of multipath feedback active filters that can serve as the bandpass filter in FIG. 4 in accordance with embodiments of the present invention.
Figure 6:
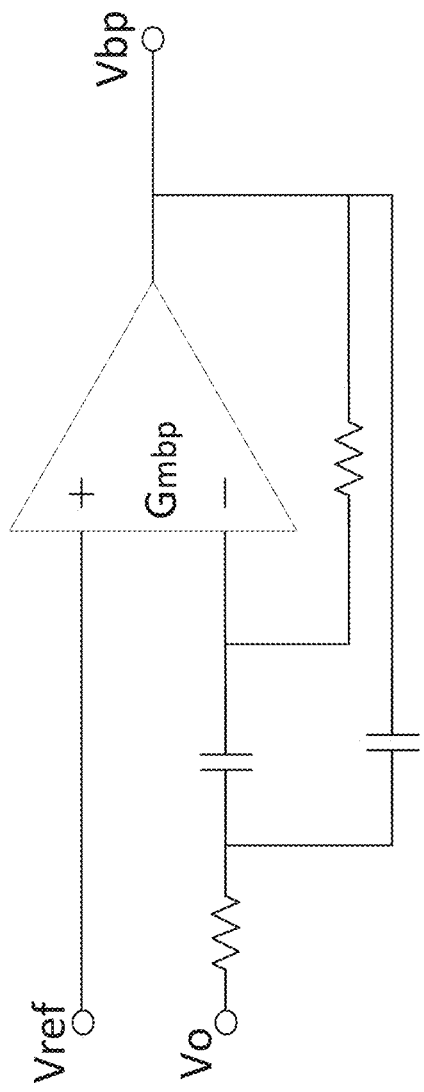

FIG. 6 provides an illustrative first circuit block 600 in the form of a multipath feedback active filter. As illustrated, the first circuit block 600 includes an operational amplifier with gain $G_{mbp}$ and two feedback paths to either side of a resistor $R_2$ via a capacitor $C_2$ and a resistor $R_1$. A transconductance amplifier could alternatively be used. First circuit block 600 includes three 12 external connections which can be used to describe how the circuit block is connected in the power converter 400.

The feedback path 401 of the power converter 400 runs through first circuit block 600 from node $V_o$ to node $V_{bp}$.

Node $V_o$ is the output node of the power converter 400 and is similarly labeled in FIG. 4. Node $V_{ref}$ connects to a reference voltage used to bias the amplifier. Notably, the presence of capacitor $C_1$ means that first circuit block 600 is AC coupled to the output side of the converter which results in the filter being at least partly defined by a pure bandpass characteristic. As first circuit block 600 will not allow a DC signal to pass through the branch of the feedback path that it provides, it can create a zero in the closed loop transfer function of the converter's control loop to provide stability to the system in a manner that is disassociated from the size of the output capacitor and output inductor of the converter. Other multipath feedback active filters can exhibit this feature. For example, first circuit block 601 is also at least partly defined by a pure bandpass characteristic and is AC coupled to node $V_o$. The first circuit block 601 also utilized an operational amplifier but could be modified to utilize a transconductance amplifier.

Figure 7:
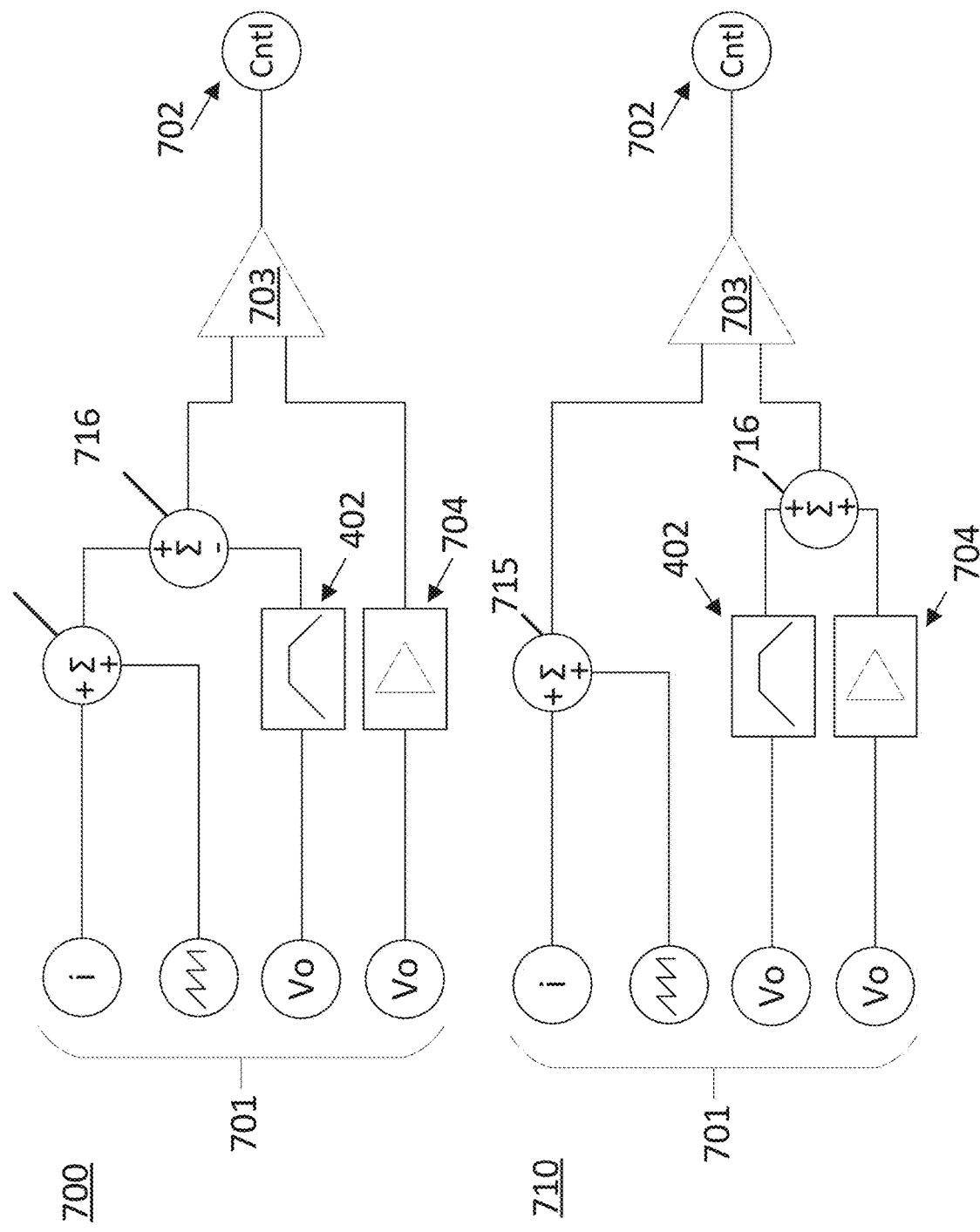
FIG. 7 illustrates two block diagrams of the feedback path in FIG. 4 in accordance with embodiments of the present invention.
Figure 8:
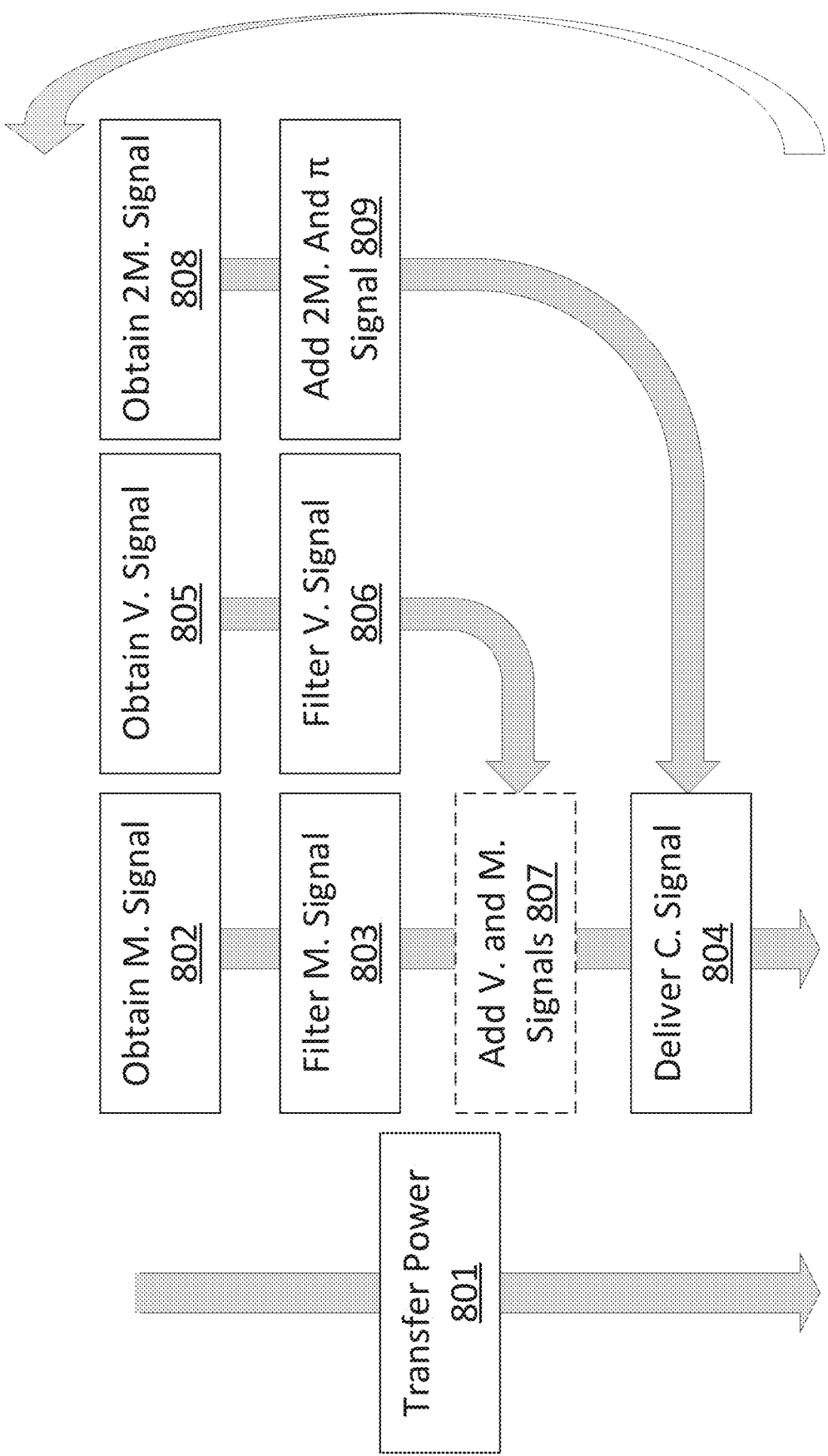
FIG. 8 illustrates a flow chart of a set of methods that are in accordance with embodiments of the present invention.

Different options for the overall topology and operation of feedback path 401 can be described with reference to the block diagrams of FIG. 7 and the flow chart of FIG. 8. FIG. 7 includes two block diagrams 700 and 710. Each diagram includes a set of inputs 701 on the left and an output to control node 702 on the right. The set of inputs include measurement signals taken from the output side of the power converter. In the examples illustrated in FIG. 7, a first measurement signal is based on the voltage on the output node of the inductor ("$V_o$") and a second measurement signal is based on the current through inductor 103 ("i"). The feedback paths exemplified by block diagrams 700 and 710 are utilized in power converters where the control node is driven by a pulse width modulator comparator 703 that is used to produce a control signal with a variable duty cycle. The comparator 703 is located on the feedback path and has a first input and a second input. The block diagram is simplified in that additional driver circuitry is usually interspersed between the output of the comparator and an actual control node (e.g., the gate of a field effect transistor).

The duty cycle of the control signal delivered to the control node is set by comparing a periodic ramp signal with the output of an error amplifier circuit 704 located on the feedback path. The error amplifier compares a first measurement signal from the output side of the converter with a reference signal. For example, the voltage on the output node of the converter $V_o$ can be compared with a reference voltage. This can be conducted by including a voltage divider circuit on the feedback path and connecting the output of the voltage divider circuit to the error amplifier. Block diagrams 700 and 710 exhibit this feature, but they are also augmented with a first circuit block 402 that serves as a bandpass filter, and a second measurement signal that is obtained from the output side of the converter. In these examples, the second measurement signal is based on the current through inductor 103. The individual contribution of the bandpass filter circuit block to the overall feedback path can be conceptualized as a compensator signal. As such, the block diagrams illustrate different ways in which the control signal delivered to control node 702 can be based on the first measurement signal, the second measurement signal, and the compensator signal.

The block diagrams in FIG. 7 differ in terms of how the signals are combined and applied through different branches of the feedback path. In block diagram 700 the output of first circuit block 402 is subtracted from the sum of the second measurement signal and the periodic signal. In block diagram 710 the output of the first circuit block 402 is added to the output of error amplifier circuit 704. The block diagrams are intended to convey a large number of potential architectures and topologies. In particular, the adder blocks 715, 716 can be implemented by actual adder circuit blocks or by placing the component circuit blocks whose outputs are being summed in series. For example, in block diagram 710 the adder block 716 connected to first circuit block 402 and error amplifier circuit 704 represents both the option of placing those blocks in series along the feedback path and the option of having a feedback path with a first branch and a second branch where those circuit blocks are on those separate branches and each terminates at the adder circuit block 716. Specific implementations of these approaches are described below in FIGS. 9-13.

The action of the architecture of power converter 400, and particular those implementations of power converter 400 that are in accordance with block diagrams 700 and 710, can be described with reference to flow chart 800 in FIG. 8. Flow chart 800 illustrates a set of methods for the operation of a power converter. The power converter includes the output node, input node, switch, and control node previously described and may utilize any of the feedback techniques described above in combination with these elements to deliver power from an input side of the converter to an output side of the converter. For purposes of explanation, the component steps of the set of methods illustrated by flow chart 800 are drawn linearly in parallel fashion with an arrow looping back to the beginning of the method. The component steps may all be continuously conducted as the methods describe the behavior of a feedback system.

In step 801 power is transferred from an input node of the power converter to an output node of the converter using a switch connected to the input node. This step is conducted continuously with a variable level of power being delivered based on the instantaneous needs of a load connected to the output node of the power converter. The additional branches of flow chart 800 are conducted continuously and in tandem with the conduct of step 801. Indeed, the additional branches of flow chart 800 describe the continuous flow of information back from the output side of the converter to the input side of the converter in order to regulate the amount of power delivered in step 801.

The second branch of flow chart 800 includes step 802 of obtaining a first measurement signal, step 803 of filtering the measurement signal, and step 804 of delivering a control signal. In combination, the steps explain the operation of one portion of the feedback path of a power converter such as power converter 400. The first measurement signal can be obtained from either a voltage or current on the output side of the power converter. However, in the approaches illustrated in FIG. 7, the measurement signal is a voltage signal obtained from the output node $V_o$. In step 803 the measurement signal is filtered using a bandpass filter circuit block to obtain a filtered measurement signal. The bandpass filter circuit block can be first circuit block 402. In step 804, a control signal that is based on the filtered measurement signal is delivered to the control node. The control node can be control node 702 from FIG. 7.

The third branch of flow chart 800 includes step 805 of obtaining a voltage measurement signal, step 806 of filtering the voltage measurement signal, and step 807 of adding the filtered voltage measurement signal to the filtered measurement signal produced in step 803. Step 805 can be conducted using a voltage divider on the output side of the power converter. Step 806 can be conducted using an error amplifier and a low pass filter on the output of the error amplifier. Step 807 can be conducted by feeding the filtered signals to an adder circuit block. Step 807 can also be conducted by using the same voltage as the basis for the measurement signal in step 802 and the voltage signal in step 805. In this case, the filtered signals can be effectively added by placing the two filters in series and allowing both filtered signals to emerge at the output of the combined circuit blocks. In approaches in which this third branch is utilized, the control signal delivered in step 804 can be based on both the filtered first measurement signal and the filtered voltage measurement signal.

The fourth branch of flow chart 800 includes step 808 of obtaining a second measurement signal on the output side of the power converter and step 809 of adding the second measurement signal to a periodic (π) signal. The second measurement signal can be the inductor current "i" from block diagrams 700 and 710. The second measurement signal can be the inductor current of the power converter measured using a sense resistor or other current sensing circuit. The periodic signal can be a periodic ramp signal. The combined signal can then be delivered to the input of a PWM comparator. The other input to the PWM comparator can be the signal generated in step 807. However, step 807 could be conducted at the input of the PWM comparator as the second measurement signal could have been previously combined with the signal generated in step 803 as in block diagram 700.

Figure 9:
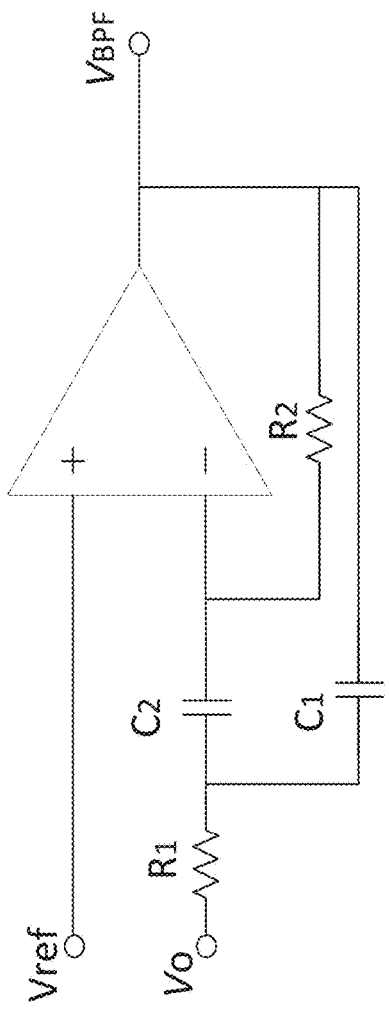
FIG. 9 illustrates a multipath feedback active filter along with the transfer function of the filter to illustrate certain aspects of embodiments of the present invention.

Certain benefits accrue to those approaches in which the center frequency and quality factor of the bandpass transfer function that defines the first circuit block 402 are designed to cancel out the effects of the effective series resistance and series inductance of the output capacitor of the power converter. In approaches where the first circuit block 402 is implemented using a multipath feedback active filter, the transfer function, and in particular the center frequency and quality factor of the transfer function, can be defined by a set of passive devices in the multipath feedback active filter. FIG. 9 illustrates one example multipath feedback active filter 900 with passive components $R_1$, $R_2$, $C_2$, and $C_1$. The figure also includes equation 901 which provides the transfer function of the filter along the feedback path from $V_o$ to $V_{BPF}$. If it is deconstructed according to standard conventions, equation 901 yields the resonant frequency expression and quality factor expression illustrated by equations 902. As shown, the quality factor and resonance of the bandpass filter can then be selected to counteract the effects of the effective series resistance 505 and effective series inductance 504 of the output capacitor of the power converter. In the case of a bandpass filter, the resonant frequency can also be referred to as the center frequency of the filter.

Selection of the components of the multiple feedback active filters utilized as bandpass filters should be conducted based on the characteristics of the output capacitor for a given application. The center frequency of the bandpass transfer function should be within one decade of the resonance caused by the output capacitor parasitics. Furthermore, the center frequency of the bandpass filter should generally be greater than the output filter resonance from L and C. The center frequency of the bandpass filter is a critical aspect of the design given that misalignment of the two values can result in an unstable converter. The quality factor of the bandpass transfer function should generally be greater than 0.5. From a first-order perspective, the larger a quality factor, the sharper the phase transition and tighter the bandwidth of the gain of a transfer function. It is important for the phase transition of the bandpass function to be sharp in order for the benefit of the poles to be realized in time before the counteracting action of the output capacitor's zeroes forces the system into an unstable state at a given frequency.

Figure 10:
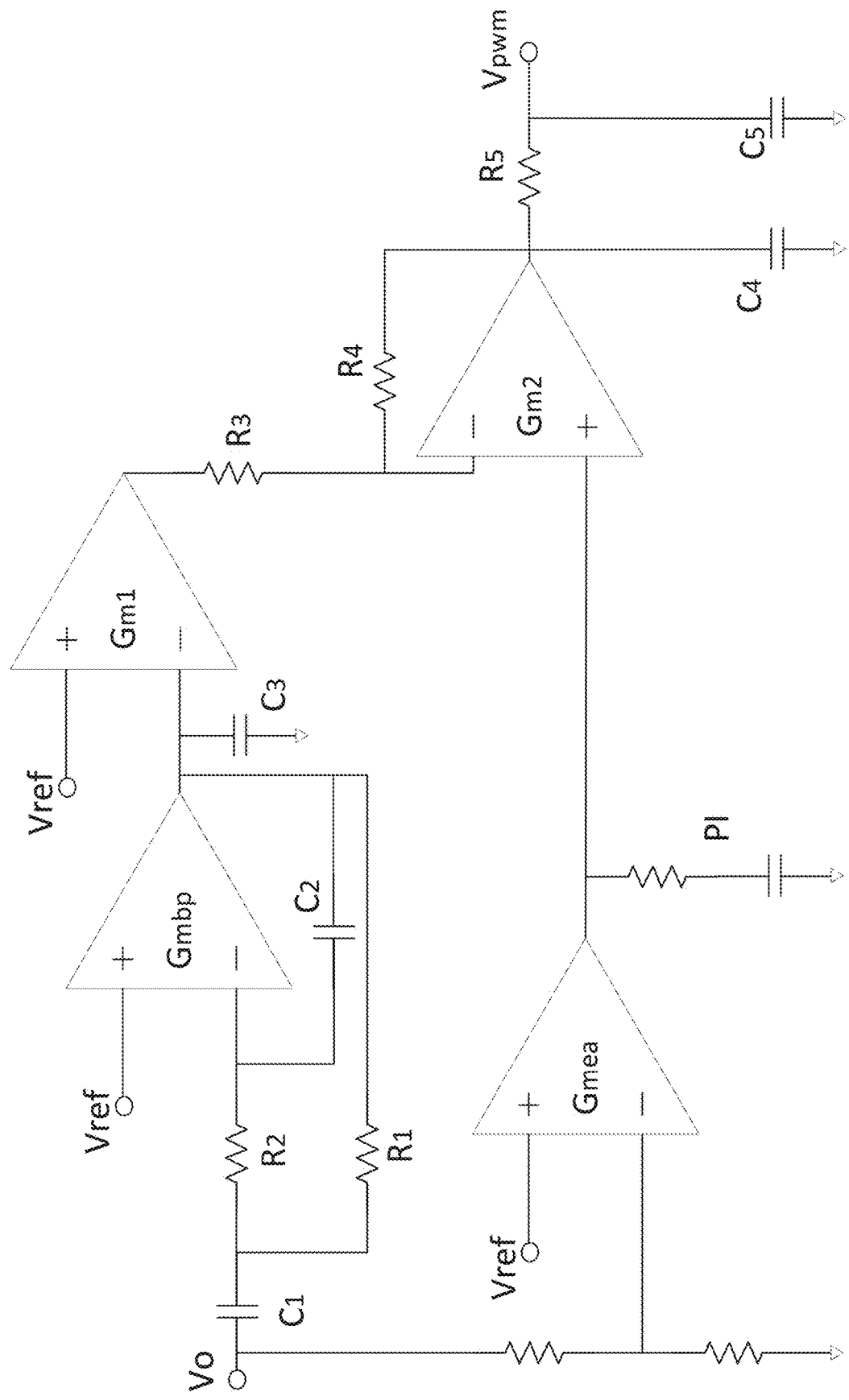
FIG. 10 illustrates a possible topology of the feedback path in FIG. 4 in accordance with embodiments of the present invention.

FIG. 10 illustrates a circuit topology 1000 which is a specific implementation of one portion of feedback path 401. Topology 1000 accepts the output node voltage of the converter as an input and also requires a reference voltage $V_{ref}$. First circuit block 402 is implemented using the transconductance amplifier marked with gain $G_{mbp}$ along with devices $C_1$, $C_2$, $R_2$, and $R_1$. The output node voltage is also connected to a voltage divider, the output of which is in turn connected to the transconductance amplifier with gain $G_{mea}$. This amplifier serves as the error amplifier. A proportional-integral compensator PI is connected to the output of the error amplifier. Topology 1000 also includes two additional transconductance amplifiers with gains marked $G_{m1}$ and $G_{m2}$. In combination with resistors $R_3$ and $R_4$, the output of the error amplifier and the output of the bandpass filter are added together. The combined signal is then passed through a low pass filter with a roll-off frequency determined by $R_5$ and $C_5$. Compensation is also provided by capacitors $C_3$ and $C_4$. The output signal generated by topology 1000 on node $V_{pwm}$ is then provided to a first input of a PWM comparator which is not shown in the diagram. The sum of a second measurement signal, which can be the inductor current of the power converter, and a periodic ramp voltage is provided to the other input of the PWM comparator. The reference voltage provided to the $G_{m1}$ and $G_{mbp}$ amplifiers can be different and less accurate than the reference voltage provided to the $G_{mea}$ amplifier.

Figure 11:
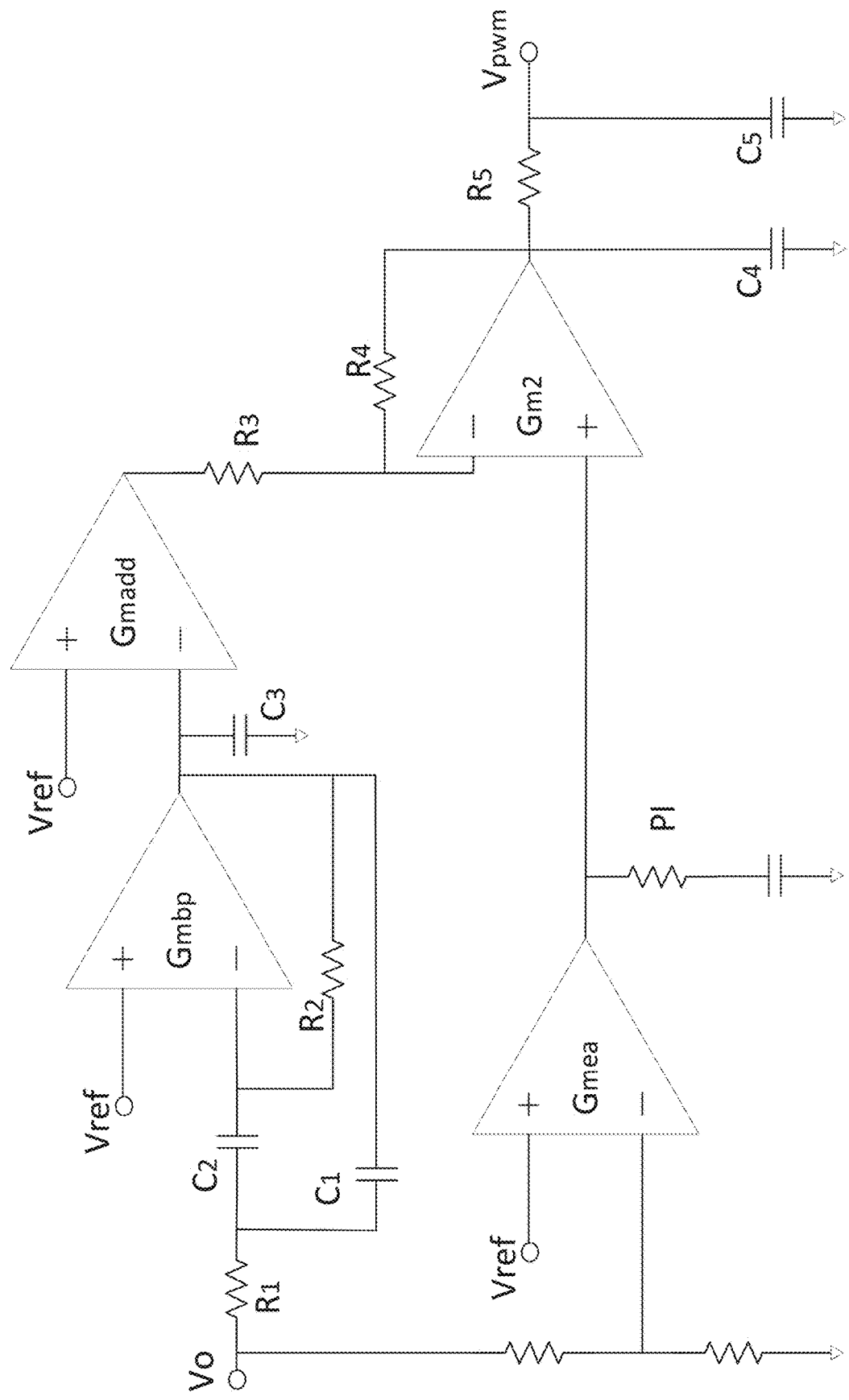
FIG. 11 illustrates another possible topology of the feedback path in FIG. 4 that utilizes a programmable amplifier in accordance with other embodiments of the present invention.

FIG. 11 illustrates a circuit topology 1100 which is a specific implementation of one portion of feedback path 401. Topology 1100 is similar to topology 1000 and like elements are labeled using the same reference identifiers. However, one branch of the feedback path is different in that first circuit block 402 is implemented using a resistor connected to node $V_o$. Notably, there is still no DC path through this implementation of the first circuit block 402, and the block is still defined by a pure bandpass transfer function in regular operation. To facilitate this modification, the second transconductance amplifier is the top circuit branch is also modified in that the gain $G_{madd}$ is programmable.

Figure 12:
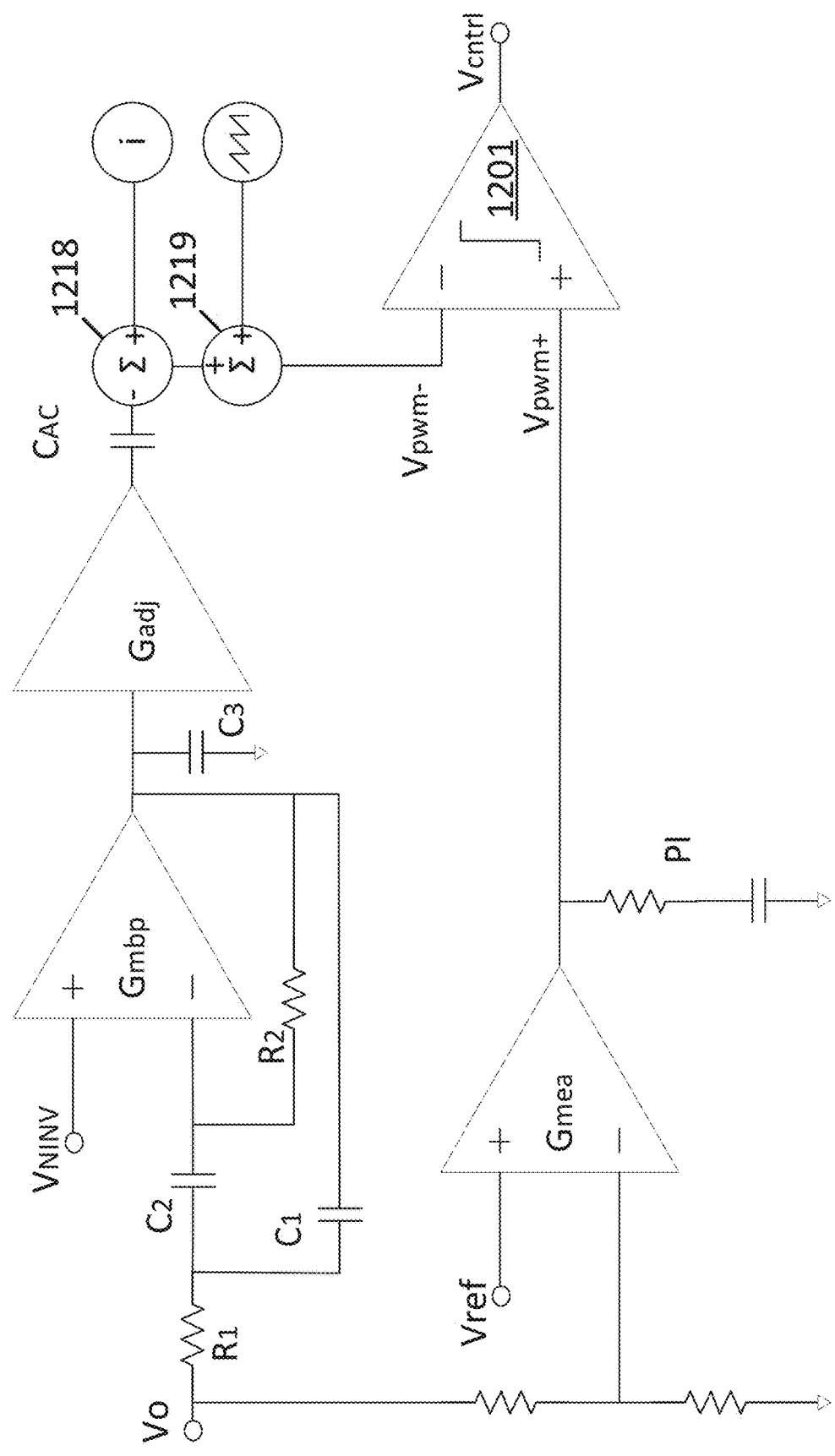
FIG. 12 illustrates another possible topology of the feedback path in FIG. 4 that combines the compensator signal with a second measurement signal before either signal is provided to a comparator in accordance with other embodiments of the present invention.

FIG. 12 illustrates a circuit topology 1200 which is a specific implementation of feedback path 401. In contrast to topologies 1000 and 1100, topology 1200 includes PWM comparator 1201 and illustrates the control node $V_{cntrl}$. Additional driver circuits may be located between the illustrated node and the actual control node of the switch circuit in the power converter. Like elements from the prior topologies are labeled using the same reference identifiers. As illustrated, the compensator signal produced by the bandpass filter is fed to a transconductance amplifier with an adjustable gain $G_{adj}$. The output of that amplifier is connected to an optional AC coupling capacitor $C_{AC}$. The resulting signal is then subtracted by a subtraction block 1218 from a second measurement signal, which is the inductor current "i" in FIG. 12. The combined signal is then summed by an adder block 1219 with a periodic ramp signal and is delivered to the negative input of PWM comparator 1201. The positive input of PWM comparator 1201 is connected to the output of the error amplifier and PI compensator. This topology requires a second reference voltage $V_{NINV}$ to bias the bandpass filter amplifier.

Figure 13:
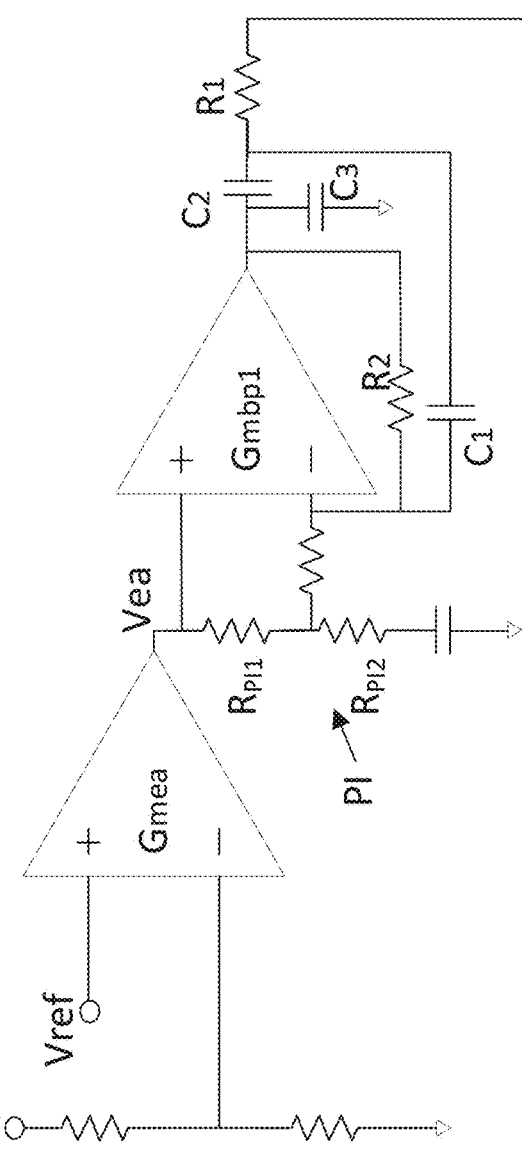
FIG. 13 illustrates another possible topology of the feedback path in FIG. 4 that adds a compensator signal and a first measurement signal by placing the bandpass filter and error amplifier in series in accordance with other embodiments of the present invention.
Figure 13:
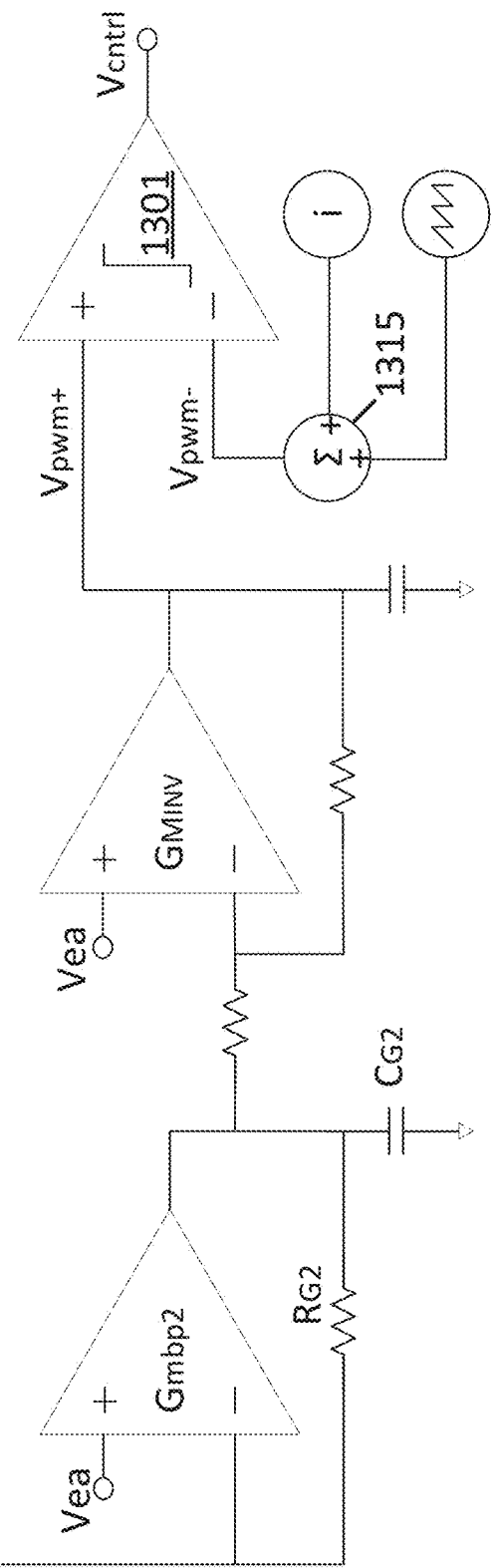

FIG. 13 illustrates a circuit topology 1300 which is a specific implementation of feedback path 401. Topology 1300 differs from the prior topologies in that the compensator signal generated by the bandpass filter is added to the error amplifier and PI compensator output by placing the circuit blocks in series. Like elements from the prior topologies are labeled using the same reference identifiers. The topology requires an additional transconductance amplifier with gain $G_{mbp2}$ and passive elements $R_{G2}$ and $C_{G2}$ to supplement the effect of the amplifier that is present in the prior topologies. The gain of that amplifier is $G_{mbp1}$ in topology 1300. Topology 1300 also requires an inverting amplifier with gain $G_{MINV}$ and a feedback network with two resistors to provide gain to the combined signal before it is delivered to the positive input of PWM comparator 1301. In this topology, the standard resistor for the PI amplifier is broken into two pieces $R_{PI1}$ and $R_{PI2}$. As such, the gain of the band pass filter and the PI amplifier can be independently adjusted. This is because the gain of the PI amplifier is set by the sum of these two resistors while the gain of the band pass filter is proportional to $R_{PI1}$ alone. As illustrated, topology 1300 includes an adder block 1315 to sum a second measurement signal in the form of inductor current "i" and a periodic ramp signal to deliver the resulting combined signal to the negative input of PWM comparator 1301. The diagram also illustrates control node $V_{cntrl}$, but additional driver circuits may be located between the illustrated node and the actual control node of the switch circuit in the power converter.

Figure 14:
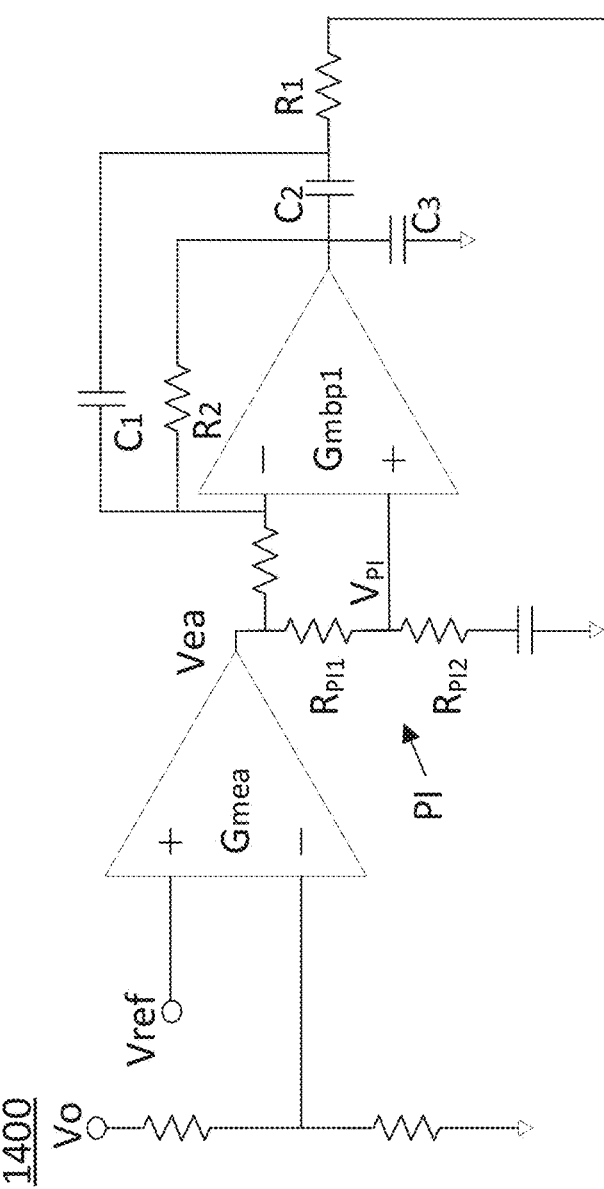
FIG. 14 illustrates another possible topology of the feedback path in FIG. 4 that adds a compensator signal and a first measurement signal by placing the bandpass filter and error amplifier in series in accordance with other embodiments of the present invention and uses one less amplifier than the topology in FIG. 13.
Figure 14:
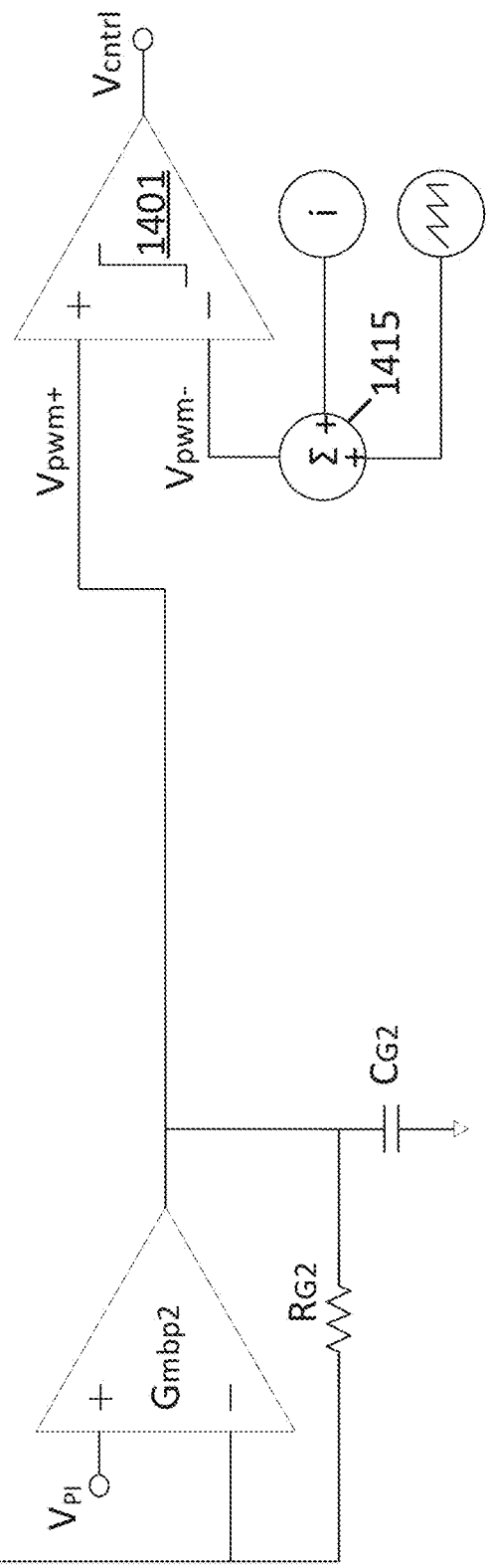

FIG. 14 illustrates a circuit topology 1400 which is a specific implementation of feedback path 401. Like elements from the prior topologies are labeled using the same reference identifiers. Topology 1400 is similar to topology 1300 in that it requires an additional transconductance amplifier with gain $G_{mbp2}$ and passive elements $R_{G2}$ and $C_{G2}$ to supplement the effect of the amplifier that is present in the prior topologies. As illustrated, topology 1400 includes an adder block 1415 to sum a second measurement signal in the form of inductor current "i" and a periodic ramp signal to deliver the resulting combined signal to the negative input of PWM comparator 1401. However, topology 1400 differs from topology 1300 in that the PI amplifier and band pass filter are configured such that the inverting amplifier is no longer required. As illustrated, the output of the error amplifier feeds directly to the positive terminal of the amplifier with gain $G_{mbp1}$. As a result, the appropriate phase can be achieved for the input to comparator 1401 without the need for an additional inverter. The voltage input to the positive terminal of the transconductance amplifier with gain $G_{mbp2}$ is $V_{PI}$ in this approach which is the voltage that is induced at the noninverting input of the transconductance amplifier with gain $G_{mbp1}$.

Figure 15:
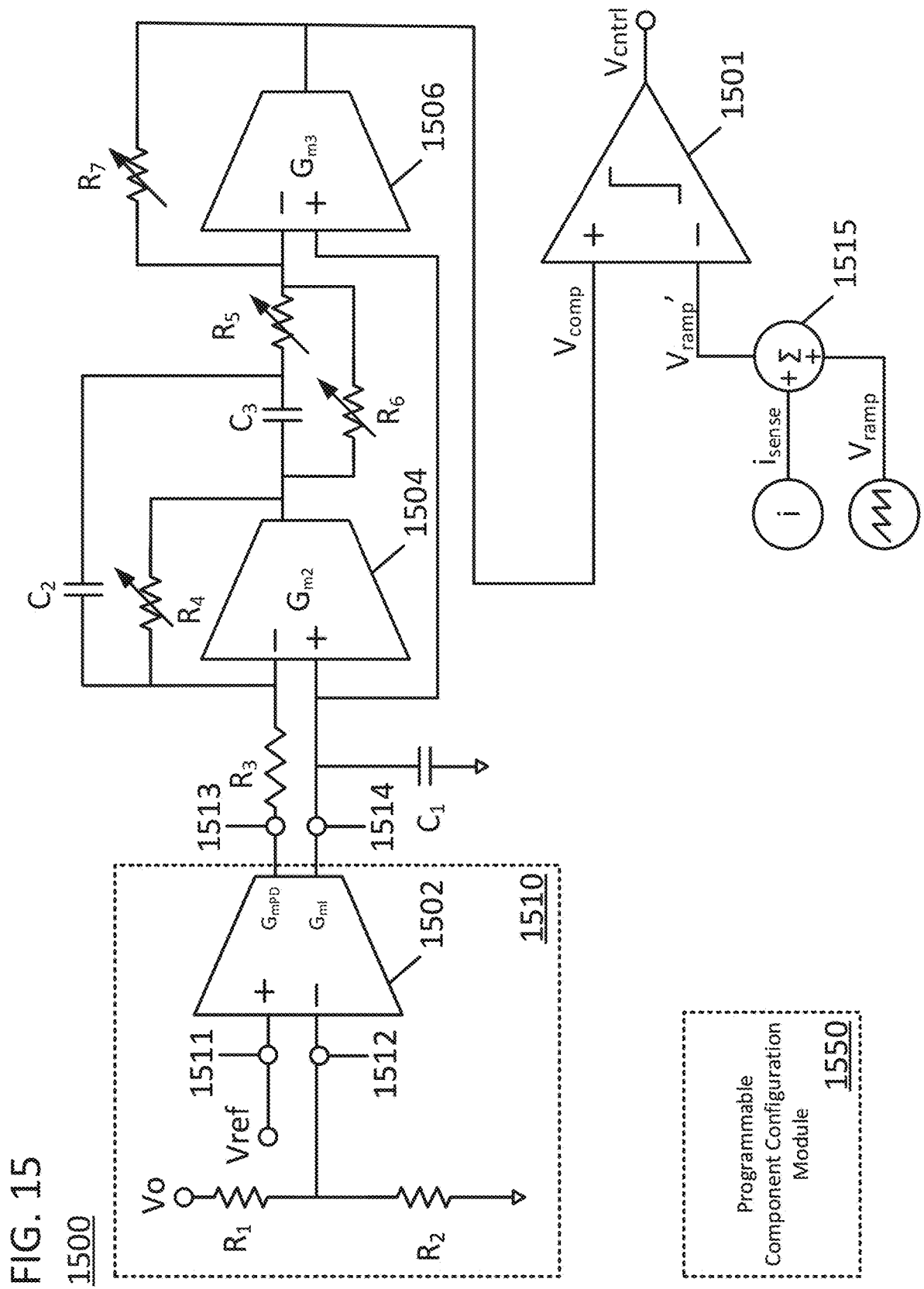
FIG. 15 illustrates a possible topology of a feedback compensation and control circuit of the feedback path in FIG. 4 that utilizes a programmable PID portion and a programmable bandpass filter portion of the feedback path in accordance with other embodiments of the present invention.

FIG. 15 illustrates another possible topology of a feedback compensation and control circuit 1500 of one portion of the feedback path 401 (shown in FIG. 4) of the power converter 400, in accordance with some embodiments. The feedback compensation and control circuit ("feedback circuit") 1500 advantageously includes a component efficient implementation of an error amplifier, a programmable proportional-integral-derivative (PID) portion, and a programmable bandpass filter portion. A bandpass filter is a circuit or device that passes frequencies within a certain frequency range and attenuates frequencies that are outside of that range. The error amplifier, the programmable PID portion, and the programmable bandpass filter portion are implemented by cascading transconductance amplifiers 1502, 1504, and 1506 in series and advantageously including a low frequency signal path that bypasses the bandpass filter portion to allow low frequency components of a feedback signal to remain unattenuated by the bandpass filter portion.

Additionally, as will be described, the feedback circuit 1500 advantageously allows the use of an integrating capacitor having a smaller capacitance value as compared to a capacitance value of an integrating capacitor used in conventional feedback compensation and control circuit implementations.

The bandpass filter portion of the feedback compensation and control circuit 1500 is characterized by a bandpass frequency response centered at a center frequency, the bandpass filter portion being configured to attenuate signals having a frequency above a first configured frequency and being configured to attenuate frequencies below a second configured frequency, the first configured frequency being greater than DC. In some embodiments, selection and/or programming of the components of the bandpass filter portion of the feedback compensation and control circuit 1500 is conducted based on characteristics of the output capacitor 104 of the power converter 400 for a given application. For example, in some embodiments, the center frequency of a bandpass transfer function of the bandpass filter portion of the feedback compensation and control circuit 1500 is configured to be within one decade of a resonance caused by parasitics of the output capacitor 104 (e.g., the parasitic resistance 505 and inductance 504 of the output capacitor 104) to counteract the effects of such resonance.

In some embodiments, the center frequency of the bandpass filter portion is additionally configured to be greater than a resonance of an output filter of the power converter 400, the resonance being substantially determined by the output capacitor 104 and the inductor 103. In some embodiments, the quality factor of the bandpass transfer function of the bandpass filter portion of the feedback compensation and control circuit 1500 is configured to be greater than 0.5.

The feedback circuit 1500 generally includes the serially cascaded transconductance amplifiers 1502, 1504, 1506, a comparator 1501, an adder block 1515, resistors $R_1$-$R_7$, and capacitors $C_1$-$C_3$. In some embodiments, an optional programmable component configuration module 1550 is in signal communication with one or more components of the feedback circuit 1500 (e.g., the resistors $R_1$-$R_7$, the capacitors $C_1$-$C_3$, and the transconductance amplifier 1502). Also shown in FIG. 15 are nodes 1511-1514. The feedback circuit 1500 may include other components which have been omitted from FIG. 15 for simplicity of discussion but are understood to be present.

An input stage 1510 of the feedback circuit 1500 includes the resistors $R_1$-$R_2$ configured as a voltage divider circuit, as well as the transconductance amplifier 1502 (i.e., an error amplifier).

The voltage divider $R_1$-$R_2$ of the input stage 1510 is configured to receive an output voltage from the output node of the power converter 400 (marked $V_O$) and provide an attenuated output voltage to an inverting input node of the transconductance amplifier 1502 through the node 1512. The feedback circuit 1500 generates a compensated feedback signal $V_{comp}$ based on the attenuated output voltage and uses the compensated feedback signal $V_{comp}$ to generate a compensated control signal at the control node $V_{cntrl}$ using the comparator 1501. The compensated control signal is received by the switch circuit 102 of the power converter 400 to control the output voltage of the power converter 400 by controlling an on-time and an off-time of one or more switches of the switch circuit 102.

The transconductance amplifier 1502 is advantageously configured as a dual output transconductance amplifier having a first programmable gain $G_{mPD}$ at a first output node (through the node 1513) and a second programmable gain $G_{mI}$ at a second output node (through the node 1514). In some embodiments, the second programmable gain $G_{mI}$ is advantageously configured to be less than the first programmable gain $G_{mPD}$m. The dual outputs of the transconductance amplifier are based on a difference between a reference voltage $V_{ref}$ received at a non-inverting input (through the node 1511) of the transconductance amplifier and the attenuated output voltage received at an inverting input (through the node 1512) of the transconductance amplifier 1502, the reference voltage $V_{ref}$ being indicative of a desired output voltage of the power converter 400. Thus, the transconductance amplifier 1502 generates a first error signal at the first output node (through the node 1513) having a first amplitude based on gain $G_{mPD}$, and a second error signal at the second output node (through the node 1514) having a second amplitude based on gain $G_{mI}$, the first and second error signals being otherwise substantially identical. This difference in amplitude advantageously reduces a required capacitance of the capacitor $C_1$ and thereby allows for the capacitor $C_1$ to be implemented as part of an integrated circuit that includes each of the other components of the feedback circuit 1500. By comparison, the transconductance amplifiers 1504, 1506 are single output transconductance amplifiers, the transconductance amplifier 1504 having a gain $G_{m2}$ and the transconductance amplifier 1506 having a gain $G_{m3}$.

As shown in FIG. 15, the transconductance amplifiers 1502, 1504, 1506 are cascaded in series, thereby allowing for a circuit component efficient implementation (i.e., minimizing or eliminating duplicated circuit components) of the feedback circuit 1500 as compared to solutions that include a parallel signal path and thus might duplicate circuit components. That is, some circuit elements of the feedback circuit 1500 are used for the both the PID compensator portion of the feedback circuit 1500 and the bandpass filter portion of the feedback circuit 1500. For example, in general, the PID compensator portion of the feedback circuit 1500 includes the transconductance amplifiers 1502, 1504, 1506, and the bandpass filter portion of the feedback circuit 1500 includes the transconductance amplifiers 1504, 1506. Because the transconductance amplifiers 1502, 1504, and 1506 are cascaded in series, signals produced by the transconductance amplifier 1502 are received at inputs of the transconductance amplifier 1504 and the transconductance amplifier 1506, and signals produced by the transconductance amplifier 1504 are received at an input of the transconductance amplifier 1506.

As described, the feedback circuit 1500 includes a programmable PID compensator portion and a programmable bandpass filter portion connected in series with the transconductance amplifier 1502 (i.e., an error amplifier). The programmable PID compensator portion and the programmable bandpass filter portion of the feedback circuit 1500 are programmed by adjusting one or more programmable circuit elements of the feedback circuit 1500, such as programmable resistors and/or programmable capacitors. The programmable circuit elements of the feedback circuit 1500 include the transconductance amplifier 1502 having one or more adjustable gains, and the programmable resistors $R_4$-$R_7$ which have programmable resistance values. In some embodiments, the programmable circuit elements of the feedback circuit 1500 include one or more programmable capacitors, of the capacitors $C_1$-$C_3$, which have programmable capacitance values. Some embodiments of the feedback circuit 1500 may include a combination of programmable resistors, non-programmable resistors, programmable capacitors, and non-programmable capacitors. For example, in some embodiments, one or more of the capacitors $C_1$-$C_3$ are programmable capacitors and one or more of the resistors $R_4$-$R_7$ are non-programmable resistors. In such embodiments, one or more programmable capacitors of the capacitors $C_1$-$C_3$ are used to adjust one or more gains of i) the proportional-integral-derivative (PID) portion of the feedback circuit 1500, and ii) the bandpass filter portion of the feedback circuit 1500.

In some embodiments, one or more of the capacitors $C_1$-$C_3$ are programmable capacitors and one or more of the resistors $R_4$-$R_7$ are programmable resistors. In such embodiments, one or more programmable capacitors of the capacitors $C_1$-$C_3$ and one or more programmable resistors of the resistors $R_4$-$R_7$ are used to adjust one or more gains of i) the proportional-integral-derivative (PID) portion of the feedback circuit 1500, and ii) the bandpass filter portion of the feedback circuit 1500.

In some embodiments, the programmable circuit elements (i.e., programmable resistors $R_4$-$R_7$ and/or programmable capacitors $C_1$-$C_3$) of the feedback circuit 1500 are programmed by a programming module (e.g., a processor) of the power converter 400 such as the optional programmable component configuration module 1550. In some embodiments, the programmable circuit elements of the feedback circuit 1500 are programmed by a programming interface (e.g., via the optional programmable component configuration module 1550) that configures one or both of a volatile or non-volatile memory element (not shown). In other embodiments, the programmable circuit elements of the feedback circuit 1500 are programmed using configuration pins (e.g., during manufacturing or as part of an out-going test), or a configuration setting register of the power converter 400, which in some embodiments are implemented as part of the optional programmable component configuration module 1550. In still other embodiments, the programmable circuit elements of the feedback circuit 1500 are programmed as part of an assembly process of the power converter 400.

An approximate equation for a transfer function of the feedback circuit 1500 is expressed as:

$$\frac{V_{Comp}}{V_{ref} - KV_O} \cong \frac{\left(sC_1 R_7 \frac{G_{mPD} R_4}{G_{mI} R_6} + 1\right)(sC_3 R_6 + 1)}{s\left(\frac{C_1}{G_{mI}}\right)(s^2 C_2 C_3 R_4 R_5 + s(C_2 + C_3)R_5 + 1)} \quad \text{(Equation 1)}$$

where s is a complex frequency and $KV_O$ is the attenuated output voltage, K being an attenuation factor applied by voltage divider implemented by the resistors $R_1$-$R_2$.

As shown in equation 1, the programmable circuit components of the feedback circuit 1500 are operable to adjust one or more of a proportional gain, integral gain, or derivative gain of the PID portion of the feedback circuit 1500. Any of the resistors $R_3$-$R_7$ of the feedback circuit 1500 may be programmable resistors. Likewise, any of the capacitors $C_1$-$C_3$ of the feedback circuit 1500 may be programmable capacitors. Additionally, the programmable circuit components of the feedback circuit 1500 are operable to adjust a gain of the bandpass filter portion of the feedback circuit 1500. For example, the integral (i.e., integrator) gain of the PID compensator portion of the feedback circuit 1500 is set by the programmable transconductance gain $G_{mI}$ of the transconductance amplifier 1502 and a capacitance value of the capacitor $C_1$. The programmable transconductance gain $G_{mPD}$ of the transconductance amplifier 1502 and a resistance value of the programmable resistor $R_7$ provide a programmable proportional gain and a programmable derivative gain for the PID compensator portion of the feedback circuit 1500, as well as a programmable gain of a bandpass function of the bandpass filter portion of the feedback circuit 1500. The programmable proportional gain of the PID compensator portion of the feedback circuit 1500 is further determined by resistance values of the programmable resistors $R_4$ and $R_6$. The programmable derivative gain of the PID compensator portion of the feedback circuit 1500 is further determined by a resistance value of the programmable resistor $R_4$ and a capacitance value of the capacitor $C_3$. Bandpass gains of the bandpass filter portion of the feedback circuit 1500 are further determined by resistance values of the resistors $R_5$, $R_4$, and capacitance values of the capacitors $C_2$, and $C_3$.

The feedback circuit 1500 advantageously uses only two transconductance amplifiers, (the transconductance amplifier 1504 and the transconductance amplifier 1506) for the bandpass filter portion of the feedback circuit 1500. The programmable resistor $R_6$ included in the bandpass filter portion of the feedback circuit 1500 bypasses (i.e., provides a signal path around, or in parallel to) the capacitor $C_3$ to provide a signal path for low frequency signals around the capacitor $C_3$, thereby allowing both low frequency (i.e., DC) feedback signals and high frequency feedback signals to traverse the feedback circuit 1500 without using component inefficient parallel signal paths. In some embodiments, such low frequency signals are DC (i.e., 0 Hz) feedback signals. In other embodiments, such low frequency signals are bounded by a desired Q of the bandpass filter portion of the feedback circuit 1500.

The adder block 1515 produces an adjusted ramp signal $V_{ramp}'$ by summing a sensed inductor current $i_{sense}$ (a sensed current through the inductor 103 as shown in FIG. 4) and a periodic ramp signal $V_{ramp}$. The adjusted ramp signal $V_{ramp}'$ is received at an inverting input of the comparator 1501. The comparator 1501 compares the adjusted ramp signal $V_{ramp}'$ to the compensated feedback signal $V_{comp}$ to produce the compensated control signal received at the control node $V_{cntrl}$. The compensated control signal received at the control node $V_{cntrl}$ is used to control one or more switches of the power converter 400 to control the output voltage level of the power converter 400 by controlling on times and off times of the one or more switches. Additional driver circuits may be located between the illustrated node at the output of the comparator 1501 and the actual control node of the switch circuit 102 of the power converter 400.

Figure 16:
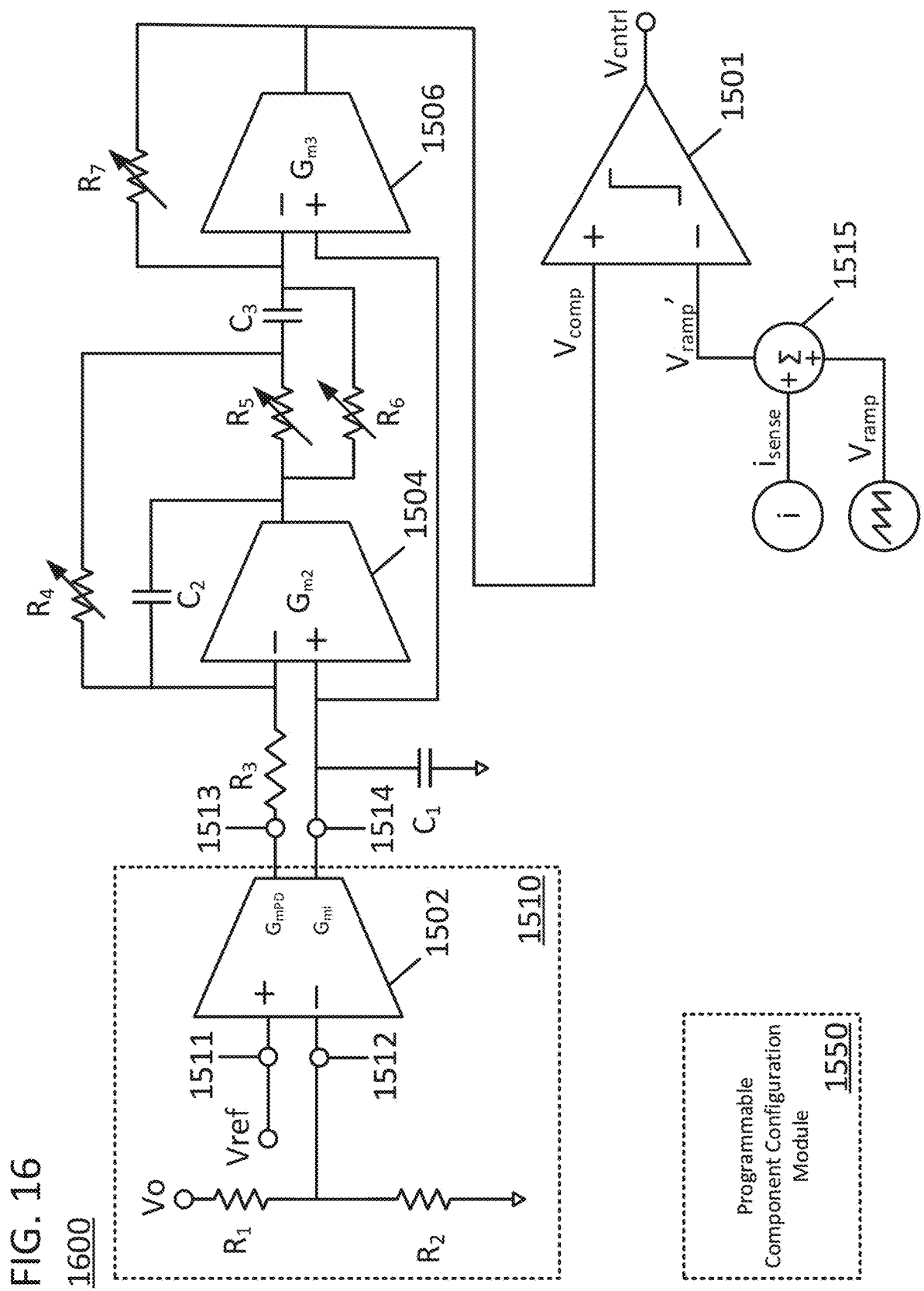
FIG. 16 illustrates another possible topology of a feedback compensation and control circuit of the feedback path in FIG. 4 that utilizes a programmable PID portion and a programmable bandpass filter portion of the feedback path in accordance with other embodiments of the present invention.

FIG. 16 illustrates another possible topology of a feedback compensation and control circuit ("feedback circuit") 1600 of one portion of the feedback path 401, in accordance with some embodiments. In some embodiments, the first circuit block 402 (shown in FIG. 4) is implemented using the feedback circuit 1600 to provide a programmable PID compensator portion and a programmable bandpass filter portion of the feedback circuit 1600. Many circuit elements of the feedback circuit 1600 are the same as introduced and described with reference to the feedback circuit 1500, differing primarily in the arrangement of the resistors $R_4$, $R_5$ and the capacitors $C_2$, $C_3$. The feedback circuit 1600 generally includes the serially cascaded transconductance amplifiers 1502, 1504, 1506, the comparator 1501, the adder block 1515, the resistors $R_1$-$R_7$, and the capacitors $C_1$-$C_3$. Also shown in FIG. 16 is the programmable component configuration module 1550 and the nodes 1511-1514. The input stage 1510 of the feedback circuit 1600 includes the resistors $R_1$-$R_2$ configured as a voltage divider circuit as well as the transconductance amplifier 1502. The feedback circuit 1600 may include other components which have been omitted from FIG. 16 for simplicity of discussion but are understood to be present.

In the embodiment shown, roles of the resistors and capacitors of the bandpass filter portion of the feedback circuit 1600 are reversed as compared to the bandpass filter portion of the feedback circuit 1500. Any of the resistors $R_3$-$R_7$ of the feedback circuit 1600 may be programmable resistors. Likewise, any of the capacitors $C_1$-$C_3$ of the feedback circuit 1600 may be programmable capacitors. In some embodiments, the integral gain of the PID compensator portion of the feedback circuit 1600 is set by the programmable transconductance gain $G_{mI}$ of the transconductance amplifier 1502 and a capacitance value of the capacitor $C_1$. In some embodiments, the programmable transconductance gain $G_{mPD}$ of the transconductance amplifier 1502 and a resistance value of the programmable resistor $R_7$ provide a programmable proportional gain and a programmable derivative gain for the PID compensator portion of the feedback circuit 1600, as well as a programmable gain of a bandpass function of the bandpass filter portion of the feedback circuit 1600. In some embodiments, the programmable proportional gain of the PID compensator portion of the feedback circuit 1600 is further determined by resistance values of the programmable resistors $R_4$-$R_6$. In some embodiments, the programmable derivative gain of the PID compensator portion of the feedback circuit 1600 is further determined by the resistance values of the programmable resistors $R_4$-$R_6$ and a capacitance value of the capacitor $C_3$. In some embodiments, the bandpass gains of the feedback circuit 1600 are further determined primarily by resistance values of the resistors $R_4$, $R_5$, and capacitance values of the capacitors $C_3$, and $C_2$. An approximate equation for a transfer function of the feedback circuit 1600 is expressed as:

$$\frac{V_{Comp}}{V_{ref} - KV_O} \cong \frac{\left(sC_1 R_7 \frac{G_{mPD}(R_4 + R_5)}{G_{mI} R_6} + 1\right)\left(sC_3 R_4 \frac{(R_6 + R_5)}{(R_4 + R_5)} + 1\right)}{s\left(\frac{C_1}{G_{mI}}\right)(s^2 C_3 C_2 R_4 R_5 + s(R_4 + R_5)C_2 + 1)} \quad \text{(Equation 2)}$$

where s is a complex frequency and $KV_O$ is the attenuated output voltage, K being an attenuation factor applied by voltage divider implemented by the resistors $R_1$-$R_2$.

Similar to the feedback circuit 1500, the feedback circuit 1600 may include, in some embodiments, either or both of programmable resistors and programmable capacitors. Some embodiments of the feedback circuit 1600 may include a combination of programmable resistors, non-programmable resistors, programmable capacitors, and non-programmable capacitors. In some embodiments, one or more of the capacitors $C_1$-$C_3$ of the feedback circuit 1600 are programmable capacitors and one or more of the resistors $R_4$-$R_7$ of the feedback circuit 1600 are non-programmable resistors. In such embodiments, one or more programmable capacitors of the capacitors $C_1$-$C_3$ are used to adjust one or more gains of i) the proportional-integral-derivative (PID) portion of the feedback circuit 1600, and ii) the bandpass filter portion of the feedback circuit 1600.

In some embodiments, one or more of the capacitors $C_1$-$C_3$ of the feedback circuit 1600 are programmable capacitors and one or more of the resistors $R_4$-$R_7$ of the feedback circuit 1600 are programmable resistors. In such embodiments, one or more programmable capacitors of the capacitors $C_1$-$C_3$ and one or more programmable resistors of the resistors $R_4$-$R_7$ are used to adjust one or more gains of i) the proportional-integral-derivative (PID) portion of the feedback circuit 1600, and ii) the bandpass filter portion of the feedback circuit 1600.

Figure 17:
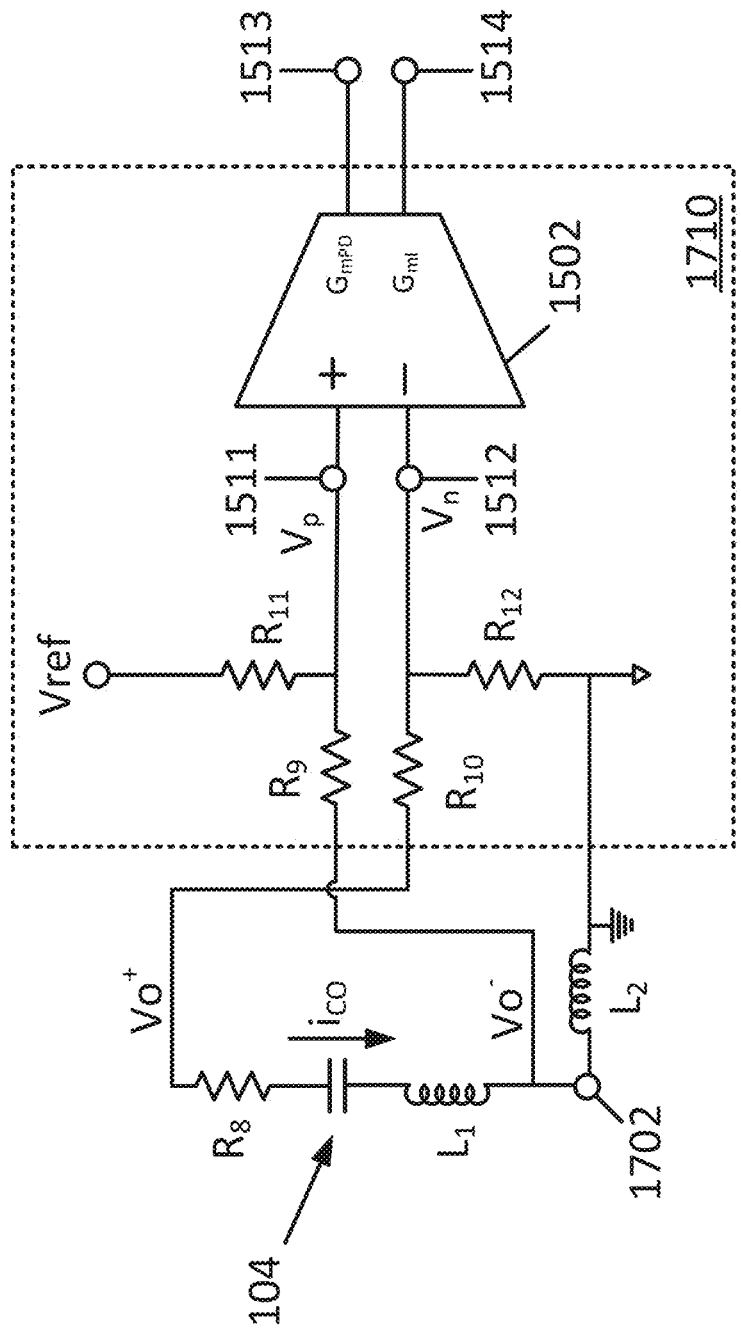
FIG. 17 illustrates another possible topology of an input stage of the feedback compensation and control circuit shown in FIG. 15 or FIG. 16 in accordance with other embodiments of the present invention.

FIG. 17 illustrates a portion 1700 of another possible topology of a feedback compensation and control circuit of the feedback path 401, in accordance with some embodiments. In particular, FIG. 17 illustrates an input stage 1710 which could replace the input stage 1510 shown in either of FIG. 15 or FIG. 16. The input stage 1710 generally includes the transconductance amplifier 1502, and resistors $R_9$-$R_{12}$. Also shown are the nodes 1511-1514, a node 1702, the capacitor 104 (the output capacitor of the power converter 400), and a visualization of parasitic resistance $R_8$ and parasitic inductances $L_1$-$L_2$. A voltage $V_p$ is received at the non-inverting input of the transconductance amplifier 1502 (through the node 1511) and a voltage $V_n$ is received at the inverting input of the transconductance amplifier 1502 (through the node 1512). The output voltage developed at the output voltage node Vo across the capacitor 104 (the output capacitor of the power converter 400) is expressed as a positive voltage component $V_O^+$ received at the resistor $R_{10}$ and a negative or reference voltage component $V_O^-$ received at the resistor $R_9$, the output voltage developed at the output voltage node $V_O$ being a voltage difference between $V_O^+$ and $V_O^-$.

The resistance $R_8$ is a parasitic resistance of the output capacitor 104, and the inductance $L_1$ is a parasitic inductance of the capacitor 104. The inductance $L_2$ is an inductance from the capacitor 104 to the transconductance amplifier 1502. A current $i_{CO}$ flows through the inductance $L_2$ to a power ground return. As shown, the input stage 1710 senses the output voltage developed at the output voltage node $V_O$ differentially as compared to the input stage 1510, the input stage 1710 advantageously removing the effects of the parasitic inductance $L_2$ from the sensing circuitry. This enables the bandpass filter portion of the feedback circuit 1500 or 1600, when implementing the input stage 1510 using the input stage 1710, to better approximate capacitor dynamics of the output capacitor 104. An approximate equation for a transfer function of the feedback circuit 1500 when using the input stage 1710 instead of the input stage 1510 is expressed as:

$$\frac{V_{Comp}}{V_p - V_n} \cong \frac{\left(sC_1 R_7 \frac{G_{mPD} R_4}{G_{ml} R_6} + 1\right)(sC_3 R_6 + 1)}{s\left(\frac{C_1}{G_{ml}}\right)(s^2 C_2 C_3 R_4 R_5 + s(C_2 + C_3) R_5 + 1)} \quad \text{(Equation 3)}$$

where s is a complex frequency.

Figure 18:
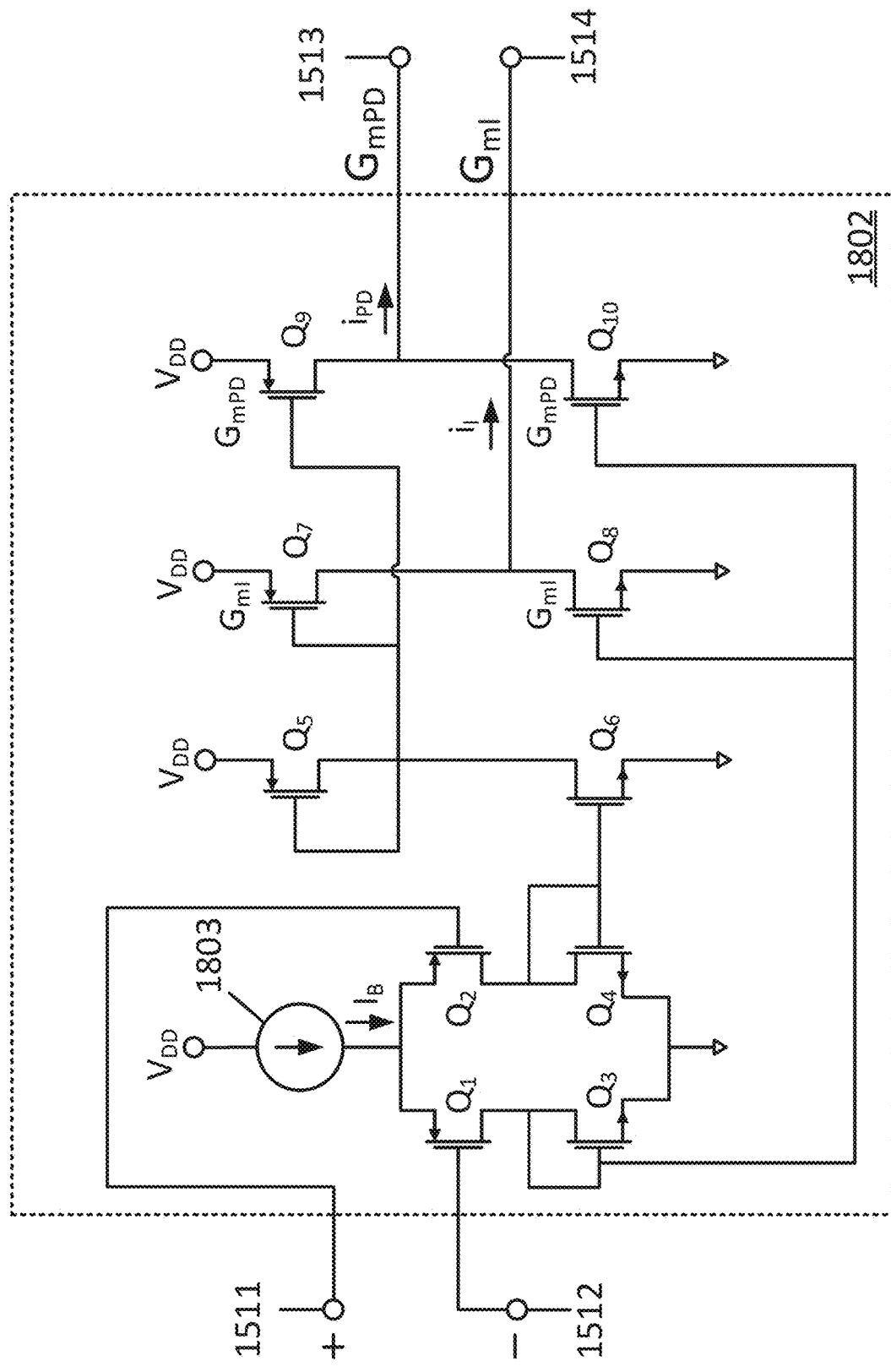
FIG. 18 illustrates a possible topology of a transconductance amplifier of the feedback compensation and control circuit shown in FIG. 15, FIG. 16, or FIG. 17 in accordance with other embodiments of the present invention.

FIG. 18 illustrates a possible topology 1800 of a transconductance amplifier 1802 to implement the dual output transconductance amplifier 1502 of the feedback compensation and control circuit shown in FIG. 15, FIG. 16, or FIG. 17, in accordance with some embodiments. The transconductance amplifier 1802 generally includes transistors Q1 through Q10 and a programmable current source 1803, coupled as shown. Also shown is the node 1511 at a non-inverting input of the transconductance amplifier 1802, the node 1512 at an inverting input of the transconductance amplifier 1802, the node 1513 at the first output of the transconductance amplifier 1802 having gain $G_{mPD}$, and the node 1514 at the second output of the transconductance amplifier 1802 having gain $G_{mI}$. The programmable current source 1803 generates a bias current $I_B$ to set or modulate a gain of the transconductance amplifier 1802. In general, the transistors Q1 and Q2, along with the bias current $I_B$, form a matched, differential input pair. The transistors Q3 and Q4 are configured in some embodiments to be matched. Diode-connected transistor Q3 is the input transistor to a current mirror circuit with output transistors Q8 and Q10 providing the output currents of the current mirror. The current through transistor Q1 is the current through transistor Q3 which is mirrored and gained by the transistors Q8 and Q10. Diode-connected transistor Q4 is the input transistor to a current mirror circuit with output transistor Q6 providing the output current of the current mirror. Diode-connected transistor Q5 is the input transistor to a current mirror circuit with output transistors Q7 and Q9 providing the output currents of the current mirror. The current through transistor Q2 is the current through transistor Q4 which is mirrored and gained by transistor Q6. The current through transistor Q6 is the current through transistor Q5 which is mirrored and gained by the transistors Q7 and Q9. The current $i_I$ is the difference of the current sourced by transistor Q7 and the current sunk by transistor Q8. The current $i_{PD}$ is the difference of the current sourced by transistor Q9 and the current sunk by transistor Q10. The gain of the current sourced by transistor Q7 to the current sourced by transistor Q2 is designed to be the same as the gain of the current sunk by transistor Q8 to the current sourced by transistor Q1, so that the transconductance from the transconductance amplifier inputs to the current $i_I$ output is $G_{mI}$. The gain of the current sourced by transistor Q9 to the current sourced by transistor Q2 is designed to be the same as the gain of the current sunk by transistor Q10 to the current sourced by transistor Q1, so that the transconductance from the transconductance amplifier inputs to current $i_{PD}$ output is $G_{mPD}$. Thus, the output current $i_I$ has transconductance gain $G_{mI}$, and the output current $i_{PD}$ has transconductance gain $G_{mPD}$.

The current gain of a current mirror can be set by the relative area of the output transistor to the input transistor. The output transistor of the current mirror can be partitioned into two or more paralleled output transistors and maintain the same gain. In some embodiments, programmable switches (e.g., transistors) (not shown), configurable to be controlled by other circuitry such as programmable memory (e.g., transistors, fuses, or anti-fuses) and/or digital logic circuitry (e.g., of the optional programmable component configuration module 1550), are operable to disconnect at least one of the paralleled output transistors from the output node and/or can set that transistor's current to zero. Thereby, the current mirror gain can be made programmable. By replacing the output current mirror transistors Q7 and Q8 with corresponding switchable, paralleled output current mirror transistors such that the relevant Q7 to Q2 and Q8 to Q1 current gains are matched with each switching configuration, the transconductance $G_{mI}$ can be made programmable. Similarly, by replacing the output current mirror transistors Q9 and Q10 with corresponding switchable, paralleled output current mirror transistors such that the relevant Q9 to Q2 and Q10 to Q1 current gains are matched with each switching configuration, the transconductance $G_{mPD}$ can be made programmable.

In some embodiments, the transconductance amplifier 1802 is configured such that the transconductance $G_{mI}$ is advantageously less than the transconductance $G_{mPD}$, thus allowing for an integrating capacitor $C_1$ having a smaller than conventional capacitance value to be used. To elaborate, the integrating capacitor $C_1$ and the transconductance $G_{mI}$ appear as a ratio $$\frac{C_1}{G_{mI}}$$

in both the numerator and denominator of Equations 1 and 2. In typical compensator circuits, the capacitance $C_1$ is much larger than capacitances of other capacitors of the compensator circuit because a zero of a transfer function of the compensator circuit is typically at a low frequency. By advantageously making the transconductance $G_{mI}$ small, the capacitor $C_1$ can be made small enough to be put on (e.g., be mounted on a carrier or substrate, or within a package of) an integrated circuit without negatively impacting other capacitors and resistors of the feedback circuit 1500 or the feedback circuit 1600.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure were directed to switching power converters that provided a fixed voltage to a regulated regime, the same approaches can be applied to power converters that provide a fixed current to a regulated regime. Furthermore, although examples in the disclosure were directed switching converters the approaches disclosed herein apply to any power converter scheme that relies on control loops with a feedback path from the output side of the converter to the input side of the converter. These and other modifications and variations to the present invention may be practiced by those skilled in the art, without departing from the scope of the present invention, which is more particularly set forth in the appended claims.

What is claimed is:

1. A power converter comprising:
an input node on an input side of the power converter;
an output node on an output side of the power converter;
a switch coupled to the input node and having a switch control node;
an inductor coupled to the switch and to the output node;
a feedback compensation and control circuit between the output node and the switch control node and comprising a plurality of programmable resistors to adjust one or more gains of i) a proportional-integral-derivative (PID) portion of the feedback compensation and control circuit, and ii) a bandpass filter portion of the feedback compensation and control circuit, the feedback compensation and control circuit receiving an output voltage from the output node and generating a compensated feedback signal based on the output voltage from the output node and the one or more gains, the switch control node being controlled based on the compensated feedback signal.

2. The power converter of claim 1, wherein:
one or more of the plurality of programmable resistors provide a low frequency signal path through the feedback compensation and control circuit.

3. The power converter of claim 2, wherein:
the low frequency signal path provides a signal path for a direct current signal to bypass bandpass filtering by the bandpass filter portion of the feedback compensation and control circuit.

4. The power converter of claim 3, wherein:
the one or more of the plurality of programmable resistors bypass a capacitor of the bandpass filter portion of the feedback compensation and control circuit.

5. The power converter of claim 1, further comprising:
an adder circuit block of the feedback compensation and control circuit configured to produce an adjusted ramp signal based on a received ramp signal and a sensed inductor current signal, the sensed inductor current signal being based on a current through the inductor coupled to the switch and to the output node; and
a comparator circuit of the feedback compensation and control circuit configured to produce a compensated control signal based on a comparison between the compensated feedback signal and the adjusted ramp signal, the compensated control signal controlling a voltage at the switch control node to adjust the output voltage of the power converter.

6. The power converter of claim 1, wherein:
the bandpass filter portion of the feedback compensation and control circuit is characterized by a bandpass frequency response centered at a center frequency, the bandpass filter portion being configured to attenuate signals having a frequency above a first configured frequency and being configured to attenuate frequencies below a second configured frequency, the first configured frequency being greater than DC.

7. The power converter of claim 6, further comprising:
an output capacitor on the output side of the power converter connected to the output node and a ground node;
wherein:
the output capacitor has an effective series resistance and an effective series inductance that produce a resonance at a resonant frequency; and
the center frequency of the bandpass filter portion is within one decade of the resonant frequency.

8. The power converter of claim 7, wherein:
the inductor and the output capacitor have an output filter resonance; and
the center frequency of the bandpass filter portion is greater than the output filter resonance.

9. The power converter of claim 1, wherein:
a plurality of serially cascaded transconductance amplifiers are configured to implement both the bandpass filter portion of the feedback compensation and control circuit and the PID portion of the feedback compensation and control circuit.

10. The power converter of claim 9, wherein:
a proportional gain of the PID portion of the feedback compensation and control circuit is based on a first transconductance of a first transconductance amplifier of the plurality of serially cascaded transconductance amplifiers, a first programmable resistance value, a second programmable resistance value and a third programmable resistance value of respective resistors of the plurality of programmable resistors;
an integral gain of the PID portion of the feedback compensation and control circuit is based on a second transconductance of the first transconductance amplifier and a capacitance of a first capacitor; and
a derivative gain of the PID portion of the feedback compensation and control circuit is based on the first transconductance of the first transconductance amplifier, the first programmable resistance value, the second programmable resistance value, and a capacitance of a second capacitor.

11. The power converter of claim 10, wherein:
a bandpass gain of the bandpass filter portion of the feedback compensation and control circuit is based on the first transconductance of the first transconductance amplifier, the first programmable resistance value, the second programmable resistance value, a fourth programmable resistance value of the plurality of programmable resistors, the capacitance of the second capacitor, and a capacitance of a third capacitor.

12. The power converter of claim 9, wherein:
a proportional gain of the PID portion of the feedback compensation and control circuit is based on a first transconductance of a first transconductance amplifier of the plurality of serially cascaded transconductance amplifiers, a first programmable resistance value, a second programmable resistance value and a third programmable resistance value of respective resistors of the plurality of programmable resistors;
an integral gain of the PID portion of the feedback compensation and control circuit is based on a second transconductance of the first transconductance amplifier and a capacitance of a first capacitor; and
a derivative gain of the PID portion of the feedback compensation and control circuit is based on the first transconductance of the first transconductance amplifier, the second programmable resistance value, and a capacitance of a second capacitor.

13. The power converter of claim 12, wherein:
a bandpass gain of the bandpass filter portion of the feedback compensation and control circuit is based on the first transconductance of the first transconductance amplifier, the second programmable resistance value, the third programmable resistance value, the capacitance of the second capacitor, and a capacitance of a third capacitor.

14. The power converter of claim 9, wherein:
a first transconductance amplifier of the plurality of serially cascaded transconductance amplifiers is configured to generate a first error signal at a first error signal output and a second error signal at a second error signal output, the first error signal and the second error signal being based on the output voltage and a reference voltage from a reference voltage source.

15. The power converter of claim 14, further comprising:
a voltage divider circuit coupled to the output node, the voltage divider circuit receiving the output voltage from the output node and producing a sensed output voltage, the sensed output voltage being received at the first transconductance amplifier.

16. The power converter of claim 14, further comprising:
an output capacitor on the output side of the power converter connected to the output node and a ground node;
wherein:
a non-inverting input of the first transconductance amplifier is coupled to the reference voltage source, the output capacitor, and the ground node; and
an inverting input of the first transconductance amplifier is coupled to the output node and the output capacitor.

17. The power converter of claim 14, wherein:
the first error signal is generated in accordance with a first gain of the first transconductance amplifier;
the second error signal is generated in accordance with a second gain of the first transconductance amplifier; and
the first gain is greater than the second gain.

18. The power converter of claim 17, wherein:
the first error signal output of the first transconductance amplifier is coupled to an inverting input of a second transconductance amplifier of the plurality of serially cascaded transconductance amplifiers; and
the second error signal output of the first transconductance amplifier is coupled to a non- inverting input of the second transconductance amplifier and is further coupled to a ground node by a first capacitor.

19. The power converter of claim 18, wherein:
a signal output of the second transconductance amplifier is coupled to an inverting input of a third transconductance amplifier of the plurality of serially cascaded transconductance amplifiers;
the second error signal output of the first transconductance amplifier is coupled to a non- inverting input of the third transconductance amplifier; and
a signal output of the third transconductance amplifier provides the compensated feedback signal.

20. The power converter of claim 19, wherein:
the signal output of the second transconductance amplifier is coupled to the inverting input of the third transconductance amplifier through a circuit comprising a first programmable resistor in parallel with a series combination of a second capacitor and a second programmable resistor, the first programmable resistor bypassing the second capacitor.

* * * * *